US010420146B2

(12) United States Patent
Fodor et al.

(10) Patent No.: US 10,420,146 B2
(45) Date of Patent: Sep. 17, 2019

(54) BIDIRECTIONAL FULL DUPLEX AWARE DETECTION OF TRANSMISSION ACTIVITY

(71) Applicant: Telefonaktiebolaget LM Ericsson (publ), Stockholm (SE)

(72) Inventors: Gabor Fodor, Hässelby (SE); Muhammad Kazmi, Sundbyberg (SE); Per Skillermark, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/505,285

(22) PCT Filed: Aug. 9, 2016

(86) PCT No.: PCT/EP2016/068974
§ 371 (c)(1),
(2) Date: Feb. 21, 2017

(87) PCT Pub. No.: WO2018/028768
PCT Pub. Date: Feb. 15, 2018

(65) Prior Publication Data
US 2018/0220463 A1    Aug. 2, 2018

(51) Int. Cl.
H04W 72/04 (2009.01)
H04W 74/08 (2009.01)
(Continued)

(52) U.S. Cl.
CPC .......... *H04W 74/0825* (2013.01); *H04L 5/14* (2013.01); *H04W 72/0406* (2013.01);
(Continued)

(58) Field of Classification Search
CPC ......... H04W 72/0406; H04W 74/0808; H04W 88/023
See application file for complete search history.

(56) References Cited

U.S. PATENT DOCUMENTS 5,726,976 A    3/1998    Thompson et al.
6,181,708 B1   1/2001    Quackenbush et al.
(Continued)

FOREIGN PATENT DOCUMENTS

EP      2975889 A1      1/2016
WO      0077980 A3     12/2000
WO     2014172160 A2   10/2014

OTHER PUBLICATIONS

Liao et al. "Listen-and-Talk: Protocol Design and Analysis for Full-duplex Cognitive Radio Networks"; Feb. 24, 2016; pp. 1-11; Cornell University Library, Ithaca, NY; XP080685720.
(Continued)

*Primary Examiner* — Ronald B Abelson
(74) *Attorney, Agent, or Firm* — Coats & Bennett, PLLC

(57) ABSTRACT

A radio device (10) configures a full duplex radio link from the radio device (10) to a further radio device (100). The full duplex radio link supports simultaneous bidirectional transmission on a carrier frequency. Further, the radio device (10) detects transmission activity on the carrier frequency. The radio device (10) determines whether the detected transmission activity is by the further radio device (100). Depending on whether the detected transmission activity is by the further radio device (100), the radio device (10) controls its own transmission activity on the carrier frequency.

15 Claims, 12 Drawing Sheets

(51) Int. Cl.
*H04W 88/02* (2009.01)
*H04L 5/14* (2006.01)
*H04W 88/08* (2009.01)

(52) U.S. Cl.
CPC ..... *H04W 74/0808* (2013.01); *H04W 88/023* (2013.01); *H04W 88/08* (2013.01)

(56) References Cited

U.S. PATENT DOCUMENTS

| | | | |
|---|---|---|---|
| 2015/0016309 A1 | 1/2015 | Fang et al. | |
| 2015/0023226 A1* | 1/2015 | Khoo | H04B 7/2212 |
| 2015/0071062 A1* | 3/2015 | Cheng et al. | H04W 72/1278 |
| 2015/0078215 A1 | 3/2015 | Zou et al. | |
| 2016/0021669 A1 | 1/2016 | Tetzlaff et al. | |
| 2016/0302181 A1* | 10/2016 | Fujishiro | H04W 72/04 |
| 2016/0316452 A1* | 10/2016 | Huang | H04W 72/005 |
| 2017/0079060 A1* | 3/2017 | Keating et al. | H04W 28/0289 |

OTHER PUBLICATIONS

ZTE. "Resource Allocation of D2D Communication"; 3GPP TSG-RAN WG1 Meeting #74bis; Oct. 7-11, 2013; Guangzhou, China; pp. 1-6; R1-134308; XP050717452.

Hammouda et al. "Full-duplex Spectrum Sensing and Access in Cognitive Radio Networks with Unknown Primary User Activities"; 2016 IEEE International Conference on Communications (ICC), IEEE, May 22, 2016; pp. 1-6; XP032921860.

Xie et al. "Does Full-Duplex Double the Capacity of Wireless Networks?"; IEEE Infocom 2014—IEEE Conference on Computer Communications; Toronto, CA; Apr. 27-May 2, 2014; pp. 253-261.

Thilina et al. "Medium Access Control Design for Full Duplex Wireless Systems: Challenges and Approaches"; IEEE Communications Magazine, May 2015; pp. 112-120.

3rd Generation Partnership Project "Technical Specification Group Radio Access Network; Study on Licensed-Assisted Access to Unlicensed Spectrum; (Release 13)"; 3GPP TR 36.889 V13.0.0 includes annexes B1, B2 and B3; Jun. 2015; pp. 1-285.

* cited by examiner

BIDIRECTIONAL FULL DUPLEX AWARE DETECTION OF TRANSMISSION ACTIVITY

TECHNICAL FIELD

The present invention relates to methods for controlling radio transmissions and to corresponding devices and systems.

BACKGROUND

In wireless communication technologies may use a Carrier Sense Multiple Access (CSMA)/Collision Avoidance (CA) scheme for avoiding colliding usage of a wireless medium. In a CSMA scheme, a node will determine if the wireless medium is idle or currently occupied by transmission activity of another node. If the wireless medium is occupied, the node may defer its own transmission activity on the wireless medium until the node senses that the wireless medium is idle. The latter type of operation is also referred to as a Listen Before Talk (LBT) procedure. When the node decides to perform a transmission on the wireless medium, it can try to detect a collision during the ongoing transmission and decide to stop the ongoing transmission. In this way, a CSMA/CA scheme can be used for managing shared usage of the wireless medium in a distributed manner.

In wireless communication networks, communication between two nodes is typically implemented as half-duplex communication. In the case of half-duplex communication, only one of the nodes can transmit at a time on a given carrier frequency. A further option, which may offer more efficient utilization of available radio resources, is to use bidirectional full duplex (BFD) communication, in which both nodes can simultaneously transmit and received on the same carrier frequency. This is typically accomplished by using self interference (SI) cancellation techniques.

However, in the case of conventional CSMA/CA schemes it may be problematic to benefit from improved resource efficiency offered by BFD communication, e.g., as observed in "Does Full-Duplex Double the Capacity of Wireless Networks?" by X. Xie et al., IEEE INFOCOM 2014—IEEE Conference on Computer Communications, Apr. 27-May 2, 2014, Toronto, Canada, or in "Medium Access Control Design for Full Duplex Wireless Systems: Challenges and Approaches" by K. M. Thilina, et al., IEEE Communications Magazine, May 2015.

Accordingly, there is a need for techniques which allow for efficient control of radio transmissions on a bidirectional full duplex radio link.

SUMMARY

According to an embodiment of the invention, a method of controlling radio transmission is provided. According to the method, a radio device configures a full duplex radio link from the radio device to a further radio device. The full duplex radio link supports simultaneous bidirectional transmission on a carrier frequency. Further, the radio device detects transmission activity on the carrier frequency. The radio device determines whether the detected transmission activity is by the further radio device. Depending on whether the detected transmission activity is by the further radio device, the radio device controls its own transmission activity on the carrier frequency.

According to a further embodiment of the invention, a method of controlling radio transmission is provided. According to the method, a control node sends control information for a full duplex radio link between a radio device and a further radio device. The full duplex radio link supports simultaneous bidirectional transmission on a carrier frequency. The control node sends the control information to at least one of the radio device and the further radio device. The control information coordinates detection of transmission activity on the carrier frequency by one of the radio device and the further radio device to occur within a time window in which transmission activity on the carrier frequency by the other one of the radio device and the further radio device is not allowed.

According to a further embodiment of the invention, a method of controlling radio transmission is provided. According to the method, a radio device sends control information for a full duplex radio link between a radio device and a further radio device. The full duplex radio link supports simultaneous bidirectional transmission on a carrier frequency. The radio device sends the control information to the further radio device. The control information coordinates detection of transmission activity on the carrier frequency by one of the radio device and the further radio device to occur within a time window in which transmission activity on the carrier frequency by the other one of the radio device and the further radio device is not allowed.

According to a further embodiment of the invention, a method of controlling radio transmission is provided. According to the method, a radio device receives control information for a full duplex radio link between the radio device and a further radio device. The full duplex radio link supporting simultaneous bidirectional transmission on a carrier frequency. The control information coordinates detection of transmission activity on the carrier frequency by the radio device to occur within a time window in which transmission activity on the carrier frequency by the further radio device is not allowed. Based on the control information, the radio device detects transmission activity on the carrier frequency during the time window in which transmission activity on the carrier frequency by the further radio device is not allowed.

According to a further embodiment of the invention, a method of controlling radio transmission is provided. According to the method, a radio device receives control information for a full duplex radio link between the radio device and a further radio device. The full duplex radio link supporting simultaneous bidirectional transmission on a carrier frequency. The control information coordinates detection of transmission activity on the carrier frequency by the further radio device to occur within a time window in which transmission activity on the carrier frequency by the radio device is not allowed. Based on the control information, the radio device controls its own transmission activity on the carrier frequency to occur outside the time window.

According to a further embodiment of the invention, a radio device is provided. The radio device is configured to configure a full duplex radio link from the radio device to a further radio device. The full duplex radio link supports simultaneous bidirectional transmission on a carrier frequency. Further, the radio device is configured to detect transmission activity on the carrier frequency. Further, the radio device is configured to determine whether the detected transmission activity is by the further radio device. Further, the radio device is configured to control its own transmission activity on the carrier frequency depending on whether the detected transmission activity is by the further radio device.

According to a further embodiment of the invention, a control node is provided. The control node is configured to send control information for a full duplex radio link between a radio device and a further radio device. The full duplex radio link supports simultaneous bidirectional transmission on a carrier frequency. The control node is configured to send the control information to at least one of the radio device and the further radio device. The control information coordinates detection of transmission activity on the carrier frequency by one of the radio device and the further radio device to occur within a time window in which transmission activity on the carrier frequency by the other one of the radio device and the further radio device is not allowed.

According to a further embodiment of the invention, a radio device is provided. The radio device is configured to send control information for a full duplex radio link between the radio device and a further radio device. The full duplex radio link supports simultaneous bidirectional transmission on a carrier frequency. The radio device is configured to send the control information to the further radio device. The control information coordinates detection of transmission activity on the carrier frequency by one of the radio device and the further radio device to occur within a time window in which transmission activity on the carrier frequency by the other one of the radio device and the further radio device is not allowed.

According to a further embodiment of the invention, a radio device is provided. The radio device is configured to receive control information for a full duplex radio link between the radio device and a further radio device. The full duplex radio link supports simultaneous bidirectional transmission on a carrier frequency. The control information coordinates detection of transmission activity on the carrier frequency by the radio device to occur within a time window in which transmission activity on the carrier frequency by the further radio device is not allowed. Further, the radio device is configured to, based on the control information, detect transmission activity on the carrier frequency during the time window in which transmission activity on the carrier frequency by the further radio device is not allowed.

According to a further embodiment of the invention, a radio device is provided. The radio device is configured to receive control information for a full duplex radio link between the radio device and a further radio device. The full duplex radio link supports simultaneous bidirectional transmission on a carrier frequency. The control information coordinates detection of transmission activity on the carrier frequency by the further radio device to occur within a time window in which transmission activity on the carrier frequency by the radio device is not allowed. Further, the radio device is configured to, based on the control information, control own transmission activity of the radio device on the carrier frequency to occur outside the time window.

According to a further embodiment of the invention, a system is provided. The system comprises a radio device and a further radio device which are connected by a full duplex radio link supporting simultaneous bidirectional transmission on a carrier frequency. The radio device is configured to detect transmission activity on the carrier frequency in a time window in which transmission activity on the carrier frequency by the further radio device is not allowed. The further radio device is configured to control its own transmission activity on the carrier frequency to occur outside the time window.

According to a further embodiment of the invention, a computer program or computer program product is provided, e.g., in the form of a non-transitory storage medium, which comprises program code to be executed by at least one processor of a radio device. Execution of the program code causes the radio device to configure a full duplex radio link from the radio device to a further radio device. The full duplex radio link supports simultaneous bidirectional transmission on a carrier frequency. Further, execution of the program code causes the radio device to detect transmission activity on the carrier frequency. Further, execution of the program code causes the radio device to determine whether the detected transmission activity is by the further radio device. Further, execution of the program code causes the radio device to control its own transmission activity on the carrier frequency depending on whether the detected transmission activity is by the further radio device.

According to a further embodiment of the invention, a computer program or computer program product is provided, e.g., in the form of a non-transitory storage medium, which comprises program code to be executed by at least one processor of a control node. Execution of the program code causes the control node to send control information for a full duplex radio link between a radio device and a further radio device. The full duplex radio link supports simultaneous bidirectional transmission on a carrier frequency. Execution of the program code causes the control node to send the control information to at least one of the radio device and the further radio device. The control information coordinates detection of transmission activity on the carrier frequency by one of the radio device and the further radio device to occur within a time window in which transmission activity on the carrier frequency by the other one of the radio device and the further radio device is not allowed.

According to a further embodiment of the invention, a computer program or computer program product is provided, e.g., in the form of a non-transitory storage medium, which comprises program code to be executed by at least one processor of a radio device. Execution of the program code causes the radio device to send control information for a full duplex radio link between the radio device and a further radio device. The full duplex radio link supports simultaneous bidirectional transmission on a carrier frequency. Execution of the program code causes the radio device to send the control information to the further radio device. The control information coordinates detection of transmission activity on the carrier frequency by one of the radio device and the further radio device to occur within a time window in which transmission activity on the carrier frequency by the other one of the radio device and the further radio device is not allowed.

According to a further embodiment of the invention, a computer program or computer program product is provided, e.g., in the form of a non-transitory storage medium, which comprises program code to be executed by at least one processor of a radio device. Execution of the program code causes the radio device to receive control information for a full duplex radio link between the radio device and a further radio device. The full duplex radio link supports simultaneous bidirectional transmission on a carrier frequency. The control information coordinates detection of transmission activity on the carrier frequency by the radio device to occur within a time window in which transmission activity on the carrier frequency by the further radio device is not allowed. Further, execution of the program code causes the radio device to, based on the control information, detect transmission activity on the carrier frequency during the time window in which transmission activity on the carrier frequency by the further radio device is not allowed.

According to a further embodiment of the invention, a computer program or computer program product is provided, e.g., in the form of a non-transitory storage medium, which comprises program code to be executed by at least one processor of a radio device. Execution of the program code causes the radio device to receive control information for a full duplex radio link between the radio device and a further radio device. The full duplex radio link supports simultaneous bidirectional transmission on a carrier frequency. The control information coordinates detection of transmission activity on the carrier frequency by the further radio device to occur within a time window in which transmission activity on the carrier frequency by the radio device is not allowed. Further, execution of the program code causes the radio device to, based on the control information, control own transmission activity of the radio device on the carrier frequency to occur outside the time window.

Details of such embodiments and further embodiments will be apparent from the following detailed description of embodiments.

DETAILED DESCRIPTION OF EMBODIMENTS

Figure 1:
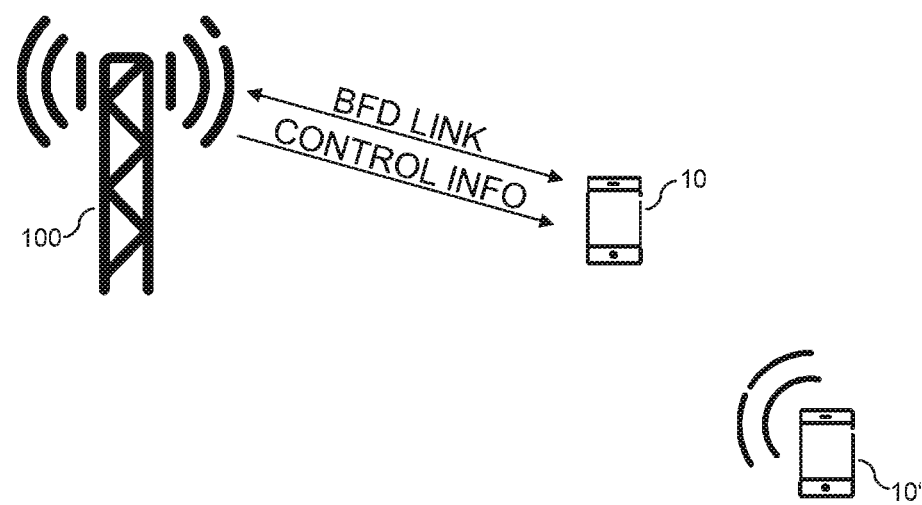
FIG. 1 schematically illustrates a scenario in which radio transmissions are controlled according to an embodiment of the invention.

In the following, concepts in accordance with exemplary embodiments of the invention will be explained in more detail and with reference to the accompanying drawings. The illustrated embodiments relate to control of radio transmissions in a wireless communication network. The wireless communication network is assumed to be based on a radio technology in which an LBT procedure is used for allowing shared usage of the same carrier frequency by multiple radio devices and in which BFD communication by two radio devices is supported. The LBT procedure includes a carrier sense (CS) operation to detect transmission activity on the carrier frequency. Optionally, also a collision detection (CD) operation may be used to detect colliding transmission activity during an ongoing radio transmission. The radio technology may for example based on using the LTE radio technology as specified by 3GPP in an unlicensed frequency spectrum, e.g., using the concept of licensed-assisted access (LAA) as discussed in 3GPP TR 36.889 V13.0.0 (2015-06). However, it is noted that the illustrated concepts may also be applied to other technologies, e.g., a next generation wireless communication technology, or a WLAN (Wireless Local Area Network) technology. In some scenarios, the concepts may be applied to BFD communication between a UE (user equipment) and an access node of the wireless communication network, e.g., a base station such as an eNB (evolved Node B) of the LTE technology. In some scenarios, the concepts may also be applied to BFD communication between two UEs, e.g., using a D2D (device-to-device) communication mode. That is to say, the two radio devices in BFD communication may correspond to a UE and an access node or to two UEs configured for D2D communication.

The BFD communication involves that the two radio devices can simultaneously transmit and receive on the same carrier frequency. This may be accomplished by using an SI cancellation technique to cancel the signal transmitted by the radio device from the signal received by the radio device.

In the illustrated concepts, a radio device performs the CS operation to detect transmission activity on the carrier frequency used for BFD communication to another radio device, in the following referred to as "BFD peer". The radio device can distinguish between the case that detected transmission activity is from the BFD peer and the case that the detected transmission activity is from another radio device. Only in the latter case the radio device will assume for the LBT procedure that the carrier frequency is occupied. In the former case, the radio device may assume for the LBT procedure that the carrier frequency is free. Accordingly, the CS operation and the LBT procedure can be performed in a manner which is aware of the BFD communication between the radio device and its BFD peer. Optionally, the radio device may also perform the CD operation to detect transmission activity on the carrier frequency during an ongoing radio transmission by the radio device. In this case, the radio device may also distinguish for the CD operation between the case that detected transmission activity is from the BFD peer and the case that the detected transmission activity is from another radio device, which is different from the BFD peer. Only in the latter case the radio device will assume that there is a colliding transmission on the carrier frequency and react by, e.g., stopping its own transmission and/or initiating a retransmission. Accordingly, also the CD operation and handling of detected collisions can be performed in a manner which is aware of the BFD communication between the radio device and its BFD peer. To enable the radio device to distinguish between the transmission activity of the BFD peer and other transmission activity, the radio device and/or the BFD peer are configured with corresponding rules and information. This may be accomplished by sending control information to the radio device and/or to the BFD peer.

FIG. 1 schematically illustrates a scenario in which a radio link supporting BFD communication on the same carrier frequency, in the following referred to as "BFD link", is established between a UE 10 and an access node 100 of the wireless communication network. In this scenario, the UE 10 may correspond to the radio device performing the CS operation and optionally also the CD operation in connection with an uplink (UL) transmission from the UE 10 to the access node 100, and the access node 100 may correspond to the BFD peer. Further, the access node 100 may correspond to the radio device performing the CS operation and optionally also the CD operation in connection with a downlink (DL) transmission from the access node 100 to the UE 10, and the UE 10 may correspond to the BFD peer. Further, FIG. 1 illustrates a further UE 10' as an example of another radio device which may generate transmission activity on the carrier frequency. To enable the above-mentioned distinction between the transmission activity of the BFD peer and other transmission activity, e.g., by the UE 10', the access node 100 may send control information to the UE 10.

Figure 2:
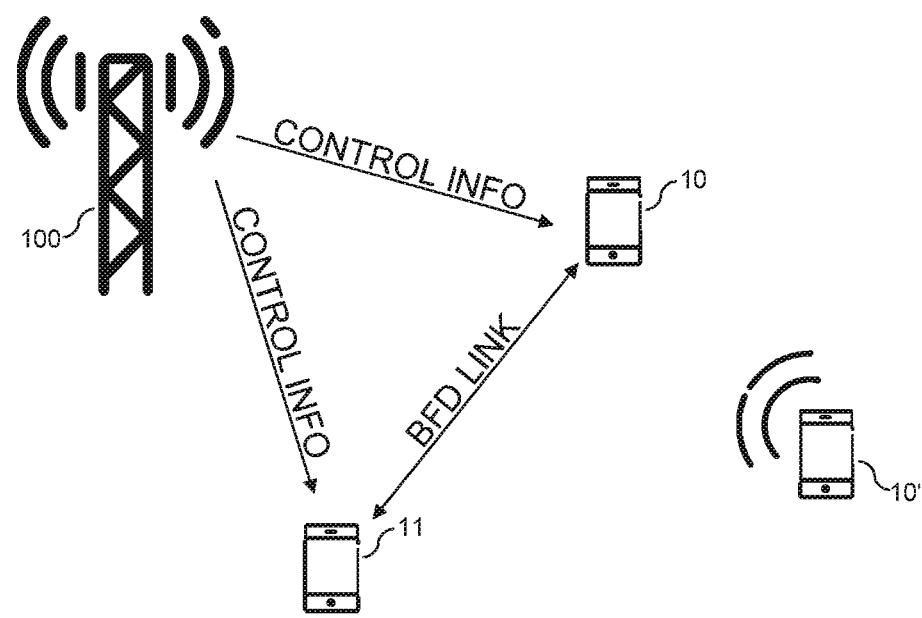
FIG. 2 schematically illustrates a further scenario in which radio transmissions are controlled according to an embodiment of the invention.

FIG. 2 schematically illustrates a scenario in which a radio link supporting BFD communication on the same carrier frequency, i.e., a BFD link, is established for D2D communication between a UE 10 and a further UE 11. In this scenario, the UE 10 may correspond to the radio device performing the CS operation and optionally also the CD operation in connection with an sidelink (SL) transmission from the UE 10 to the further UE 11, and the UE 11 may correspond to the BFD peer. Further, FIG. 2 illustrates a further UE 10' as an example of another radio device which may generate transmission activity on the carrier frequency. To enable the above-mentioned distinction between the transmission activity of the BFD peer and other transmission activity, e.g., by the UE 10', an access node 100 of the wireless communication network may send control information to the UE 10 and/or to the UE 11.

Figure 3:
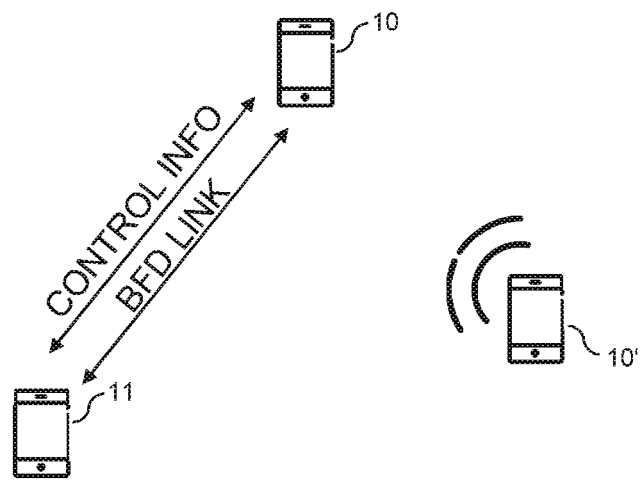
FIG. 3 schematically illustrates a further scenario in which radio transmissions are controlled according to an embodiment of the invention.

FIG. 3 schematically illustrates a scenario in which a radio link supporting BFD communication on the same carrier frequency, i.e., a BFD link, is established for D2D communication between a UE 10 and a further UE 11. In this scenario, the UE 10 may correspond to the radio device performing the CS operation and optionally also the CD operation in connection with an sidelink (SL) transmission from the UE 10 to the further UE 11, and the UE 11 may correspond to the BFD peer. Further, FIG. 2 illustrates a further UE 10' as an example of another radio device which may generate transmission activity on the carrier frequency. To enable the above-mentioned distinction between the transmission activity of the BFD peer and other transmission activity, e.g., by the UE 10', the UE 10 may send control information to the UE 11 and/or to the UE 11 may send control information to the UE.

It is noted that in the scenarios of FIGS. 1, 2, and 3 the functionalities related to the CS operation and optionally the CD operation may be provided in a symmetric manner in the radio device and its BFD peer. That is to say, the UE 10 and the access node 100 of FIG. 1 may be regarded as a pair of BFD peers. Similarly, the UE 10 and the UE 11 of FIG. 2 may be regarded as a pair of BFD peers, and the UE 10 and the UE 11 of FIG. 3 may be regarded as a pair of BFD peers.

Figure 4:
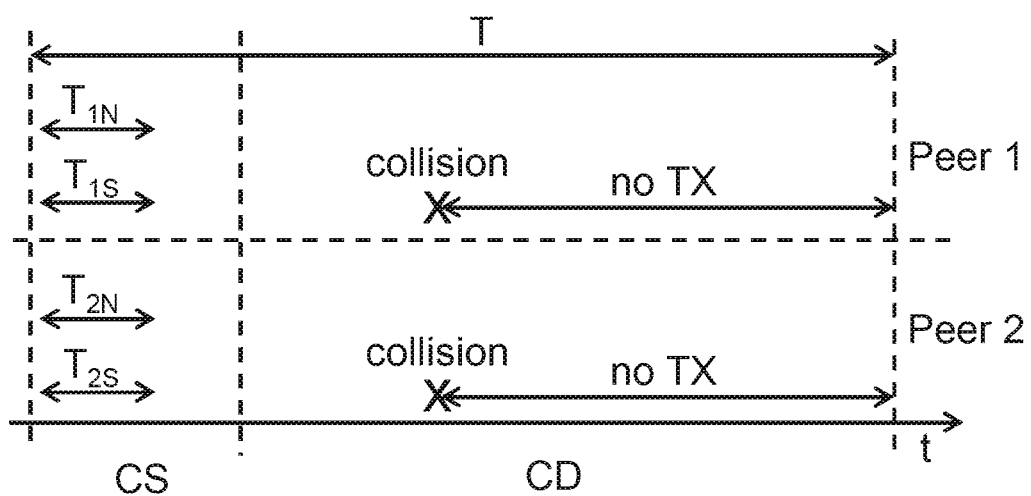
FIG. 4 schematically illustrates an example of timing for detecting transmission activity according to an embodiment of the invention.

FIG. 4 shows an example of how the detection of transmission activity by a first BFD peer and a second BFD peer, referred to as "Peer 1" and "Peer 2", respectively, may be organized in the time (t) domain. The BFD peers of FIG. 4 may for example correspond to the UE 10 and the access node 100 of FIG. 1, to the UE 10 and the UE 11 of FIG. 2, or to the UE 10 and the UE 11 of FIG. 3.

In the example of FIG. 4, radio transmissions between the BFD peers are assumed to be organized on the basis of a periodic time pattern. A time period T is applied repeatedly by the BFD peers for controlling the timing of the CS operation and of the CD operation. The time period T may for example be defined in terms of one or more radio frames, one or more subframes, or a sequence of modulation symbols.

As illustrated, the time period T includes a first time interval in which the BFD peers perform the CS operation and a second time interval in which the BFD peers perform the CD operation. The first BFD peer performs the CS operation in a sensing time window $T_{1S}$. The second BFD peer performs the CS operation in a sensing time window $T_{2S}$. Further, the first BFD peer is configured to not transmit on the carrier frequency during a silence period $T_{1N}$. Similarly, the first BFD peer is configured to not transmit on the carrier frequency during a silence period $T_{2N}$. The above-mentioned control information may be used for configuring and coordinating the sensing time window $T_{1S}$ and the silence period $T_{2N}$ in such a way that they at least partially overlap. Further, the above-mentioned control information may be used for configuring and coordinating the sensing time window $T_{1S}$ and the silence period $T_{2N}$ in such a way that they at least partially overlap. The control information may inform the second peer about the sensing time window $T_{1S}$ and/or of the silence period $T_{1N}$ applied by the first BFD peer. Further, the control information may inform the first peer about the sensing time window $T_{2S}$ and/or of the silence period $T_{2N}$ applied by the second BFD peer. In some scenarios, the first BFD peer may also be configured to assume that the sensing time window $T_{1S}$ is completely overlapped by the silence period $T_{2N}$. Similarly, the second BFD peer may also be configured to assume that the sensing time window $T_{2S}$ is completely overlapped by the silence period $T_{1N}$.

When the first BFD peer detects transmission activity in the silence period $T_{2N}$, it can thus conclude that this detected transmission activity cannot be due to a transmission by the second BFD peer, but must come from another radio device. Similarly, if the second BFD peer detects transmission activity in the silence period $T_{1N}$, it can conclude that this detected transmission activity cannot be due to a transmission by the second BFD peer, but must come from another radio device. When detecting transmission activity by another radio device, the first BFD peer and the second BFD peer consider the carrier frequency as being occupied. Otherwise, if there is no detected transmission activity or only transmission activity by the respective BFD peer, the first BFD peer and the second BFD peer consider the carrier frequency as being unoccupied.

In the example of FIG. 4, the sensing time windows $T_{1S}$, $T_{2S}$ and the silence periods $T_{1N}$, $T_{2N}$ all coincide. This configuration may facilitate coordination of the time windows and silence periods. Further, this may allow for implementing the CS operation without SI cancellation. However, it would also be possible that the sensing time window $T_{1S}$ coincides with the silence period $T_{2N}$, while being disjunct from the silence period $T_{1N}$. Similarly, the sensing time window $T_{2S}$ may coincide with the silence period $T_{1N}$, while being disjunct from the silence period $T_{2N}$. In a generalized scenario, the sensing time windows $T_{1S}$, $T_{2S}$ and the silence periods $T_{1N}$, $T_{2N}$ may be configured with various amount of overlap and offset with respect to each other.

If the sensing time window $T_{1S}$ is disjunct from the silence period $T_{1N}$, the first BFD peer does not need to utilize SI cancellation during the CS operation. However, if there is some overlap of the sensing time window $T_{1S}$ and the silence period $T_{1N}$, the first BFD peer may apply SI cancellation during the CS operation to limit impact of its own transmission on the CS operation. For this purpose, the same SI cancellation procedures as used for BFD communication may be applied. Similarly, if the sensing time window $T_{2S}$ is disjunct from the silence period $T_{2N}$, the second BFD peer does not need to utilize SI cancellation during the CS operation. However, if there Is some overlap of the sensing time window $T_{2S}$ and the silence period $T_{2N}$, the second BFD peer may apply SI cancellation during the CS operation to limit impact of its own transmission on the CS operation. For SI cancellation during the CS operation, the first BFD peer and/or the second BFD peer may apply the same SI cancellation procedures as used for BFD communication.

As further illustrated, after performing the CS operation in the first time interval of a given time period T and detecting that there is no transmission activity by another radio device on the carrier frequency, the BFD peers may each proceed to perform a transmission on the carrier frequency. In the second time interval the BFD peers may then perform the CD operation. Also for the CD operation, the BFD peers distinguish between transmission activity by the respective other BFD peer and transmission activity of another radio device. In this case, the distinction may be based on attempting decoding of radio signals in the detected transmission activity, based on assuming that the radio signals originate from the BFD peer. If the decoding of radio signals is possible, the decoded radio signals may be removed from the detected transmission activity and any remaining residual transmission activity identified as transmission activity by another radio device. If there is such transmission activity by another radio device, the BFD peers will detect a collision and initiate corresponding actions. In the example of FIG. 4, it is assumed that both BFD peers first determine that the carrier frequency is unoccupied and start transmitting on the carrier frequency, but then during the CD operation in the second time interval detect a collision. In response to detecting the collision, the BFD peers stop further transmitting on the carrier frequency. This is illustrated by time intervals denoted by "No TX".

When configuring the BFD link between the first BFD peer and the second BFD peer, the following configurations may be accomplished on the basis of the above-mentioned control information:

A set of one or more carrier frequencies to be utilized for the BFD communication may be configured in the first BFD peer and the second BFD peer. If multiple carrier frequencies are utilized, the CS operation and CD operation may be performed for each of the carrier frequencies. The multiple carrier frequencies may correspond to a single contiguous set of frequencies, e.g., subcarriers of one resource block or of multiple adjacent resource blocks. Further, the multiple carrier frequencies may be from different non-adjacent frequency ranges, e.g., different frequency bands.

Further, the sensing time windows $T_{1S}$, $T_{2S}$ and the silence periods $T_{1N}$, $T_{2N}$ may be configured in the first BFD peer and the second BFD peer.

Further, the time period T and the first and second time interval within the time period may be configured in the first BFD peer and the second BFD peer. For example, T can correspond to one or more radio frames, where one radio frame can have a duration of 10 ms. The time period T could thus be a multiple of 10 ms radio frames. The time period could also be a function of the silence periods silence periods $T_{1N}$, $T_{2N}$ and/or of the sensing time windows $T_{1S}$, $T_{2S}$. By way of example, the time period T could be defined as a function $T=f(T_{1N}, T_{2N})$ or $f(T_{1S}, T_{2S})$. According to a further example, time period T could be defined as a function $T=f(T_{1N}, T_{2N}, \alpha)$ or $T=f(T_{1S}, T_{2S}, \alpha)$, where $\alpha$ is a constant or a variable to adjust periodicity of the CS and/or CD operation. The parameters $T_{1N}$, $T_{2N}$, $T_{1S}$, $T_{2S}$, and/or a can be expressed in terms of modulation symbols, time slots, subframes, or multiples of subframes, radio frames, multiples of radio frames, or the like. The above-mentioned function f can correspond to or be based on a maximum function, a sum function, or the like.

Further, orthogonal sequences may be configured in the BFD peers. Specifically, the first BFD peer may be configured with a first sequence and the second BFD peer may be configured with a second sequence which is orthogonal to the first sequence. The orthogonal sequences may for example be based on cyclically shifted Zadoff-Chu sequences. Other orthogonal sequences may be assigned to other radio devices which might transmit on the carrier frequency or carrier frequencies configured for the BFD communication of the first BFD peer and the second BFD peer. During BFD communication, the BFD peers may transmit their respective sequence as unique identification signal, reference signal, or signature.

Figure 5A:
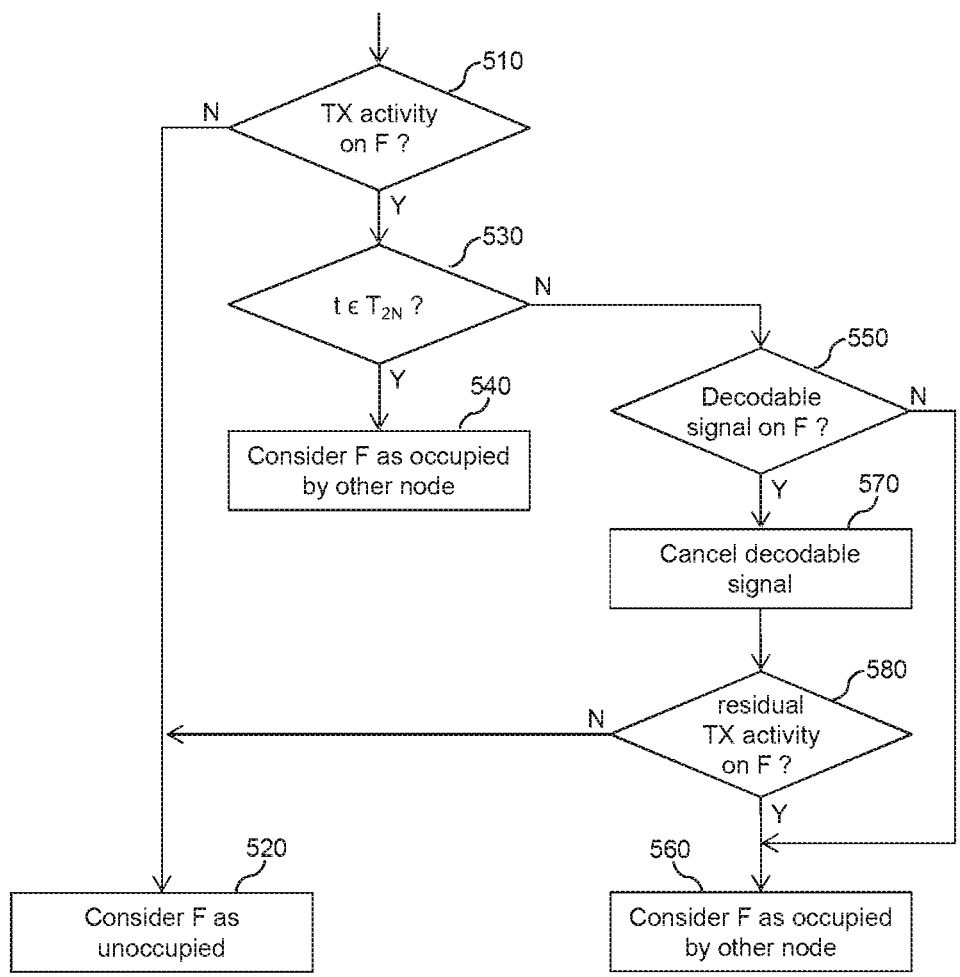
FIGS. 5A and 5B schematically illustrates sensing of occupation of a carrier frequency according to an embodiment of the invention.

FIG. 5A shows a flowchart for illustrating how the CS operation may be implemented by the first BFD peer. The processes of FIG. 5A may be performed when the first BFD peer needs to gain access to the carrier frequency F configured for the BFD communication with the second BFD peer, e.g., in response to data for transmission to the second BFD peer becoming available at the first BFD peer. The processes of FIG. 5A are assumed to be performed in the sensing time window $T_{1S}$ configured for the first BFD peer.

At block 510, the first BFD peer checks if there is transmission activity on the carrier frequency F configured for the BFD communication with the second BFD peer. If this is not the case, the first BFD peer proceeds to block 520, as indicated by branch "N", and considers the carrier frequency F as being unoccupied. If the first peer detects transmission activity on the carrier frequency F, the first peer proceeds to block 530, as indicated by branch "Y".

At block 530, the first BFD peer checks if the current time t is within the silence period $T_{2N}$ configured for the second BFD peer. If this is the case, the first BFD peer proceeds to block 540, as indicated by branch "Y", and considers the carrier frequency F as occupied by some other radio device than the second BFD peer.

If at block 530 the current time is found to be not within the silence period $T_{2N}$ configured for the second BFD peer. If this is the case, the first BFD peer proceeds to block 550, as indicated by branch "N".

At block 550, the first BFD peer checks if there is a decodable signal on the carrier frequency F configured for the BFD communication with the second BFD peer. For example, if the transmission activity on the carrier frequency F is at least in part due a BFD communication signal from the second BFD peer, this BFD communication signal would typically be decodable by the first BFD peer. For attempting decoding of signals from the detected transmission activity, the first BFD peer may also utilize a unique identification signal, reference signal, or signature known to be transmitted by the second BFD peer, e.g., based on the above-mentioned orthogonal sequence. The unique identification signal, reference signal, or signature may for example be used for determining whether a detected decodable signal originates from the second BFD peer. If no decodable signal from the second BFD peer is found at block 550, the transmission activity on the carrier frequency F can thus be attributed to some other radio device and the first BFD peer proceeds to block 560, as indicated by branch "N", and considers the carrier frequency F as occupied by some other radio device than the second BFD peer.

If a decodable signal is found at block 550, the first BFD peer proceeds to block 570, as indicated by branch "Y", and cancels the decodable signal from the detected transmission activity. For this purpose, various kinds of interference cancellation techniques may be applied, e.g., involving reconstruction of the decodable signal from the decoded data and subtraction of the reconstructed decodable signal from the detected transmission activity.

At block 580, the first BFD peer checks if there is any residual transmission activity after cancellation of the decodable signal from the detected transmission activity. If this is the case, the first BFD peer proceeds to block 560, as indicated by branch "Y", and considers the carrier frequency F as occupied by some other radio device than the second BFD peer. If the first BFD peer finds no residual transmission activity, the first BFD peer proceeds to block 520, as indicated by branch "N", and considers the carrier frequency F as being unoccupied.

The assessment whether the carrier frequency F is unoccupied or occupied by some other radio device may be used in various ways in an LBT procedure. For example, if at block 560 the carrier frequency Is found to be occupied by some other radio device, the first BFD peer may refrain from transmitting on the carrier frequency F at least until expiry of a pre-defined or configurable time period T1. Expiry of this time period could for example be defined by the next occasion of performing the CS operation in the sensing time window $T_{1S}$. On the other hand, if the carrier frequency F is found to be unoccupied, the first BFD peer may start transmitting on the carrier frequency F at least until expiry of a pre-defined or configurable time period T2. The time period T2 could be the same as the time period T1, e.g., be defined by the next occasion of performing the CS operation in the sensing time window $T_{1S}$.

Figure 5B:
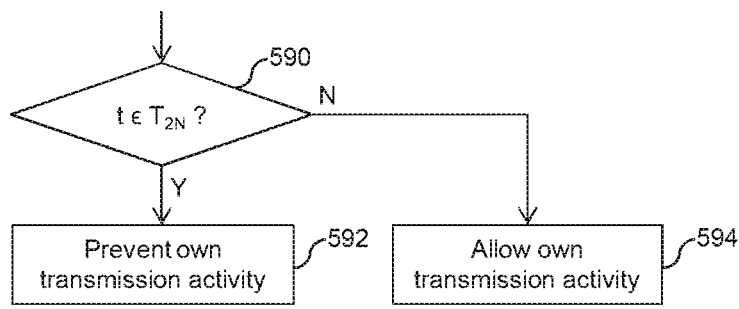

FIG. 5B shows a flowchart for illustrating how the CS operation may be implemented by the second BFD peer. The processes of FIG. 5B may be performed while the second BFD peer transmits on the carrier frequency F configured for the BFD communication with the first BFD peer.

At block 590, the second BFD peer checks if the current time t is within the silence period $T_{2N}$ configured for the second BFD peer. If this is the case, the second BFD peer proceeds to block 592 to prevent own transmission activity on the carrier frequency F configured for BFD communication with the first BFD peer, as indicated by branch "Y". For example, the second BFD peer may interrupt an ongoing transmission on the carrier frequency F until the end of the silence period $T_{2N}$ or defer starting of a transmission on the carrier frequency F until the end of the silence period $T_{2N}$. If the current time t is not within the silence period $T_{2N}$ configured for the second BFD peer, the second BFD peer proceeds to block 594 to allow own transmission activity on the carrier frequency F configured for BFD communication with the first BFD peer, as indicated by branch "N". For example, the second BFD peer may continue with an ongoing transmission on the carrier frequency F or start a transmission on the carrier frequency F.

By preventing its own transmission activity on the carrier frequency F during the silence period $T_{2N}$, the second BFD peer enables the first BFD peer to use the check of step 520 to distinguish between transmission activity of the second BFD peer and transmission activity of some other radio device. The distinction between transmission activity of the second BFD peer and transmission activity of some other radio device can thus be enabled by coordination of the sensing time window $T_{1S}$ and the silence period $T_{2N}$.

By the CS operation, the first BFD peer may detect various levels of transmission activity on the carrier frequency F, e.g., due to a location of the second BFD peer relative to the first BFD peer or due to different interference levels caused by signals from other nearby radio devices. However, since the first BFD node can distinguish between transmission activity by the second BFD peer and transmission activity by other radio devices, the CS operation may be performed in a BFD aware manner and the carrier frequency F treated as being unoccupied if only transmission activity by the second BFD peer is detected.

It is noted that in scenarios where the sensing time window $T_{1S}$ configured for the first BFD peer is completely overlapped by the silence period $T_{2N}$ configured for the second BFD peer, the first BFD peer may implicitly assume that any detected transmission activity is within the silence period $T_{2N}$. In this case, steps 530, 540, 550, 570, and 580 could be omitted.

Further, it is noted that while the processes of FIGS. 5A and 5B have been described from the perspective of a CS operation performed by the first BFD peer, corresponding processes could also be implemented in the case of a CS operation performed by the second BFD peer. However, the second BFD peer could apply different parameters than the first BFD peer. For example, the above-mentioned time periods T1 and/or T2 could be configured differently from the first BFD peer.

During ongoing BFD communication, i.e., during a transmission of data on the carrier frequency F, the BFD peers may also perform the CD operation to detect collisions with transmissions by other radio devices. When one of the BFD peers detects a collision with a transmission by some other radio device on the carrier frequency F configured for the BFD communication between the first BFD peer and the second BFD peer, this BFD peer may trigger one or more actions for handling the collision. For example, the BFD peer may stop its own transmission. When stopping a transmission of data, the BFD peer may also initiate a retransmission of the data. The retransmission could be performed on another carrier frequency.

When in the CD operation the one of the BFD peers detects transmission activity on the carrier frequency F, the BFD peer may determine whether the detected transmission activity is by the other BFD peer or by some other radio device. In the latter case, the BFD peer may treat the detected transmission activity as collision and take corresponding actions, e.g., as mentioned above. In the former case, the BFD peer may refrain from taking further actions and continue with its transmission on the carrier frequency F.

For detecting whether the detected transmission activity is by the other BFD peer, the BFD peer may determine whether the detected transmission activity includes a decodable signal which can be attributed to the other BFD peer. For this purpose, the BFD peer may also utilize a unique Identification signal, reference signal, or signature known to be transmitted by the other BFD peer, e.g., based on the above-mentioned orthogonal sequence. The unique identification signal, reference signal, or signature may for example be used for determining whether a detected decodable signal originates from the other BFD peer. If the BFD peer finds no decodable signal from the other BFD peer, the detected transmission activity on the carrier frequency F can be attributed to some other radio device and be treated as a collision. Otherwise, the BFD peer may continue with its ongoing transmission or take other measures which are appropriate in this situation.

By way of example, a CD operation implemented by the first BFD peer could be implemented as follows. While transmitting data on the carder frequency F, the first BFD peer receives signals on the carrier frequency F. The first BFD peer monitors the received signals for detecting transmission activity of other radio devices Further, the first BFD peer also monitors the received signals for decoding signals from the second BFD peer. The first BFD peer may apply SI cancellation to separate its own transmission activity on the carrier frequency F from the received signals. If the first BFD peer detects transmission activity and at the same time fails to decode signals from the second BFD peer, the first BFD peer assumes that there was a collision of its own transmission activity on the carrier frequency F with transmission activity of some other radio device on the carrier frequency F. The first BFD peer may then stop the transmission of the data on the carrier frequency F. At a later time, the first BFD peer may initiate a retransmission of the data. If the first BFD peer receives an acknowledgement from the second BFD peer that the transmission of the data was successful, the first BFD peer may refrain from initiating a retransmission of the data. If the first BFD peer detects transmission activity and at the same time succeeds in decoding signals from the second BFD peer, the first BFD peer assumes that there was no collision. It may then also send an acknowledgement to the second BFD peer to indicate that it was able to successfully decode data from the second BFD peer. The first BFD node may also initiate a retransmission of the data when no collision was detected, e.g., if successful decoding of the data is not acknowledged by the second BFD peer. Depending on a retransmission protocol used for the BFD communication, the latter may involve that no positive acknowledgement, also referred to as "ACK" is received within a certain time interval, and/or that the first BFD peer receives a negative acknowledgement indicating a transmission failure, also referred to as "NACK", from the second BFD peer.

It is noted that in cases where multiple carrier frequencies are configured for the BFD communication of the first BFD peer and the second BFD peer, the above-described processes related to the CS operation or the CD operation could be implemented for each of these carrier frequencies.

Figure 6:
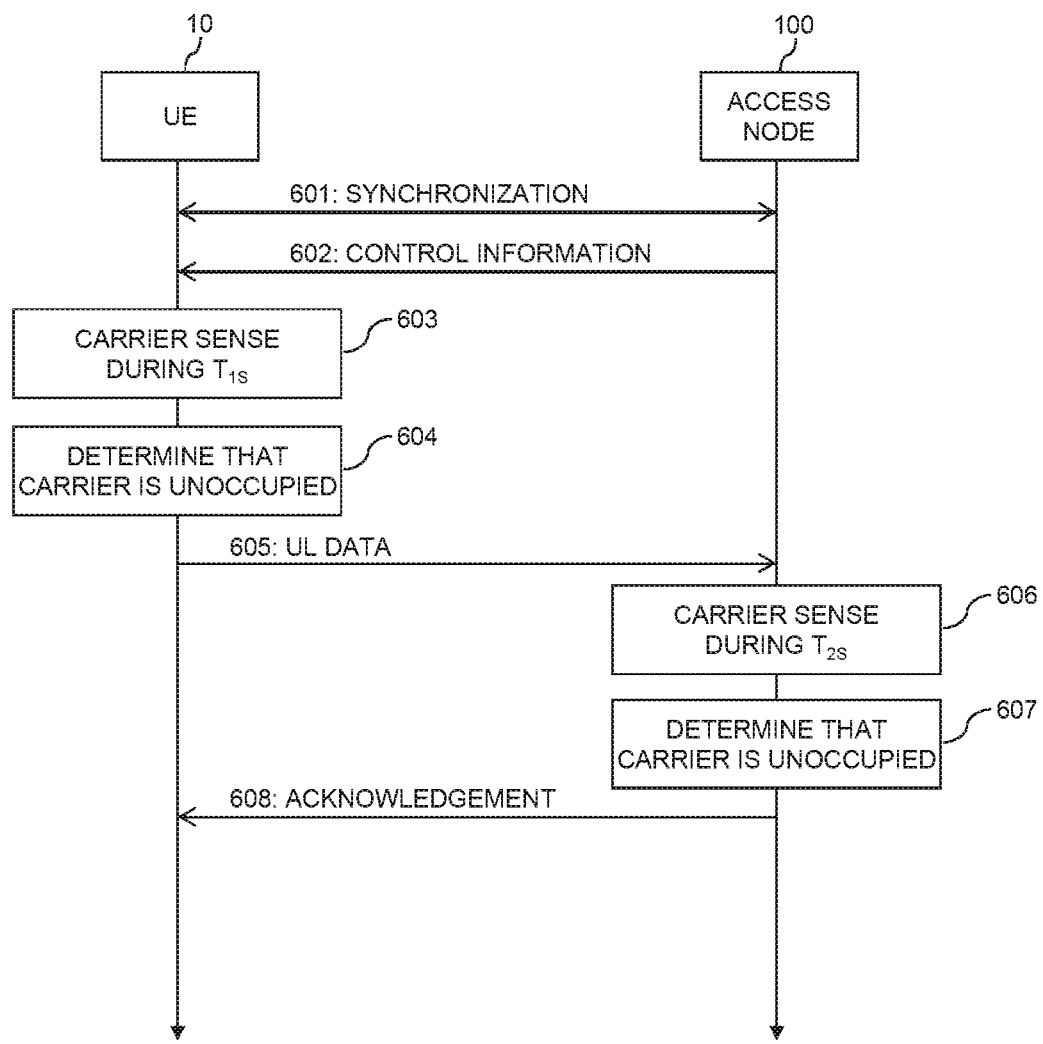
FIG. 6 schematically illustrates an example of a carrier sensing process according to an embodiment of the invention.

FIG. 6 shows exemplary processes which are based on the above-mentioned CS operation. The example of FIG. 6 assumes BFD communication according to the scenario of FIG. 1. Specifically, the first BFD peer is assumed to correspond to the UE 10 of FIG. 1, and the second BFD peer is assumed to correspond to the access node 100 of FIG. 1. However, it is to be understood that corresponding processes could also be performed in the scenario of FIG. 2 or in the scenario of FIG. 3. In the illustrated example, it is further assumed that BFD communication between the UE 10 and the access node 100 is based on a retransmission protocol requiring that successful decoding of data is confirmed by sending an acknowledgement to the sender of the data.

As illustrated by 601, the UE 10 and the access node 100 may first perform synchronization, The synchronization may help to establish a common timing reference of the UE 10 and the access node 100. For example, the synchronization may be performed on the basis of a PSS (Primary Synchronization Signal) and/or SSS (Secondary Synchronization Signal) broadcasted by the access node.

As further illustrated, the access node 100 may transmit control information 602 to the UE 10. This may in particular include the above-mentioned control information for enabling the UE 10 to distinguish between transmission activity of its BFD peer, i.e., the access node 100, and transmission activity of some other radio device. The control information 602 may for example configure the UE 10 to perform the CS operation in the above-mentioned sensing time window $T_{1S}$. Further, the control information make informed the UE 10 that in the silence period $T_{2N}$ the access node 100 is not transmitting on the carrier frequency F. Further, the control information 602 may also indicate a unique identification signal, reference signal, or signature to be applied by the UE 10 in the BFD communication and/or a unique identification signal, reference signal, or signature to be applied by the access node 100 in the BFD communication. The control information 602 could for example at least in part be transmitted in broadcasted system information, e.g., in an SIB (System Information Block). In addition or as an alternative, the control information could also be transmitted in UE specific control signalling, e.g., in one or more RRC (Radio Resource Control) messages.

In the illustrated example it is assumed that the transmission of control information to the access node 100 is not needed to enable the access node 100 to distinguish between transmission activity of its BFD peer, i.e., the UE 10, and transmission activity of some other radio device. Rather, this information may be determined locally at the access node 100. For example, the access node 100 may determine the sensing time windows $T_{1S}$, $T_{2S}$ and the silence periods $T_{1N}$, $T_{2N}$ and indicate at least some of these parameters in the control information 602 to the UE 10 and also utilize at least some of these parameters locally when performing the CS operation. However, it is noted that at least a part of this information could also be negotiated or otherwise agreed by the UE 10 and the access node 100.

At some time, the UE 10 may need to transmit UL data to the access node 100 and thus first performs the CS operation during the sensing time window $T_{1S}$, as illustrated by at block 603. The CS operation may be based on the processes explained in connection with FIG. 5A and in particular take into account that during the silence period $T_{2N}$ the access node 100 is not transmitting on the carrier frequency F. In the example of FIG. 6, it is assumed that a result of the CS operation of block 603 the carrier frequency F is found to be unoccupied, as illustrated by block 604. Accordingly, the UE 10 proceeds to perform a transmission of the UL data on the carrier frequency F, as illustrated by 605.

In the example of FIG. 6, it is further assumed that the access node 100 successfully decodes the UL data and thus needs to send an acknowledgement to the UE 10. Before sending the acknowledgement, the access node 100 performs the CS operation during the sensing time window $T_{2S}$, as illustrated by at block 606. The CS operation may be based on the processes explained in connection with FIG. 5A and in particular take into account that during the silence period $T_{1N}$ the UE 10 is not transmitting on the carrier frequency F. In the example of FIG. 6, it is assumed that a result of the CS operation of block 606 the carrier frequency F is found to be unoccupied, as illustrated by block 607. Accordingly, the access node 100 proceeds to perform a transmission of the acknowledgement on the carrier frequency F, as illustrated by 608.

Figure 7:
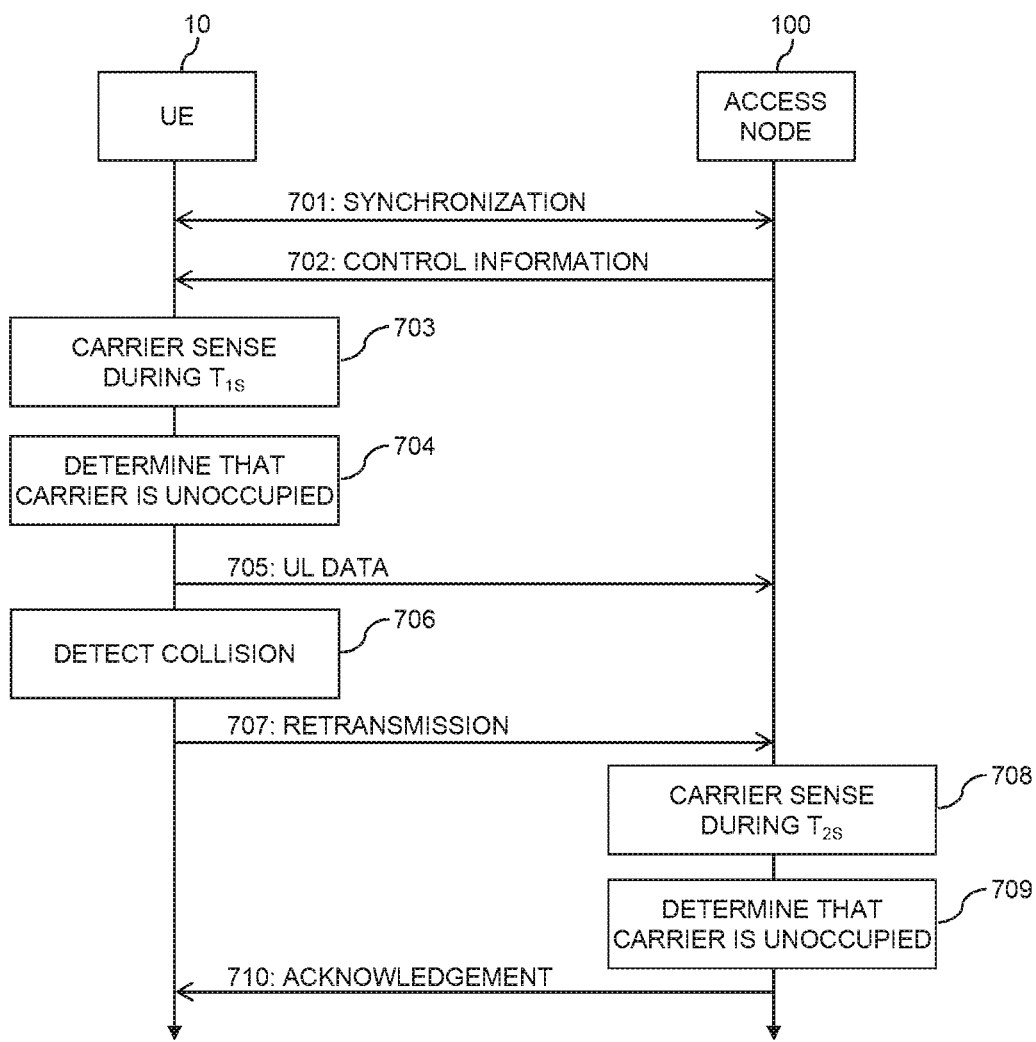
FIG. 7 schematically illustrates an example of a collision detection process according to an embodiment of the invention.

FIG. 7 shows further exemplary processes which are based on the above-mentioned CS operation and CD operation. The example of FIG. 7 assumes BFD communication according to the scenario of FIG. 1. Specifically, the first BFD peer is assumed to correspond to the UE 10 of FIG. 1, and the second BFD peer is assumed to correspond to the access node 100 of FIG. 1. However, it is to be understood that corresponding processes could also be performed in the scenario of FIG. 2 or in the scenario of FIG. 3. In the illustrated example, it is further assumed that BFD communication between the UE 10 and the access node 100 is based on a retransmission protocol requiring that successful decoding of data is confirmed by sending an acknowledgement to the sender of the data.

As illustrated by 701, the UE 10 and the access node 100 may first perform synchronization, The synchronization may help to establish a common timing reference of the UE 10 and the access node 100. For example, the synchronization may be performed on the basis of a PSS and/or SSS broadcasted by the access node.

As further illustrated, the access node 100 may transmit control information 702 to the UE 10. This may in particular include the above-mentioned control information for enabling the UE 10 to distinguish between transmission activity of its BFD peer, i.e., the access node 100, and transmission activity of some other radio device. The control information 702 may for example configure the UE 10 to perform the CS operation in the above-mentioned sensing time window $T_{1S}$. Further, the control information make informed the UE 10 that in the silence period $T_{2N}$ the access node 100 is not transmitting on the carrier frequency F. Further, the control information 702 may also indicate a unique identification signal, reference signal, or signature to be applied by the UE 10 in the BFD communication and/or a unique identification signal, reference signal, or signature to be applied by the access node 100 in the BFD communication. The control information 702 could for example at least in part be transmitted in broadcasted system information, e.g., in an SIB. In addition or as an alternative, the control information could also be transmitted in UE specific control signalling, e.g., in one or more RRC messages.

In the illustrated example it is assumed that the transmission of control information to the access node 100 is not needed to enable the access node 100 to distinguish between transmission activity of its BFD peer, i.e., the UE 10, and transmission activity of some other radio device. Rather, this information may be determined locally at the access node 100. For example, the access node 100 may determine the sensing time windows $T_{1S}$, $T_{2S}$ and the silence periods $T_{1N}$, $T_{2N}$ and indicate at least some of these parameters in the control information 702 to the UE 10 and also utilize at least some of these parameters locally when performing the CS operation. However, it is noted that at least a part of this information could also be negotiated or otherwise agreed by the UE 10 and the access node 100.

At some time, the UE 10 may need to transmit UL data to the access node 100 and thus first performs the CS operation during the sensing time window $T_{1S}$, as illustrated by at block 703. The CS operation may be based on the processes explained in connection with FIG. 5A and in particular take into account that during the silence period $T_{2N}$ the access node 100 is not transmitting on the carrier frequency F. In the example of FIG. 7, it is assumed that a result of the CS operation of block 703 the carrier frequency F is found to be unoccupied, as illustrated by block 704. Accordingly, the UE 10 proceeds to perform a transmission of the UL data on the carrier frequency F, as illustrated by 705.

In the example of FIG. 7, it is further assumed during the transmission 705 of the UL data, the UE 10 detects a collision with transmission activity by another radio device on the carrier frequency F, as illustrated by block 706. The collision may for example be due to transmission activity by the further UE 10'. For detecting the collision the UE 10 may for example receive radio signals on the carrier frequency F and attempt to decode signals originating from the access node 100. If this decoding fails, the UE 10 may conclude that the radio signals include transmission activity of some other radio device and assume that there was a collision. As a consequence, the UE 10 may stop its transmission on the carrier frequency F and initiate a retransmission of the UL data, as illustrated by 707.

In the example of FIG. 7, it is further assumed that the access node 100 successfully decodes the UL data from the retransmission 707 and thus needs to send an acknowledgement to the UE 10. Before sending the acknowledgement, the access node 100 performs the CS operation during the sensing time window $T_{2S}$, as illustrated by at block 708. The CS operation may be based on the processes explained in connection with FIG. 5A and in particular take into account that during the silence period $T_{1N}$ the UE 10 is not transmitting on the carrier frequency F. In the example of FIG. 7, it is assumed that a result of the CS operation of block 708 the carrier frequency F is found to be unoccupied, as illustrated by block 709. Accordingly, the access node 100 proceeds to perform a transmission of the acknowledgement on the carrier frequency F, as illustrated by 710.

Figure 8:
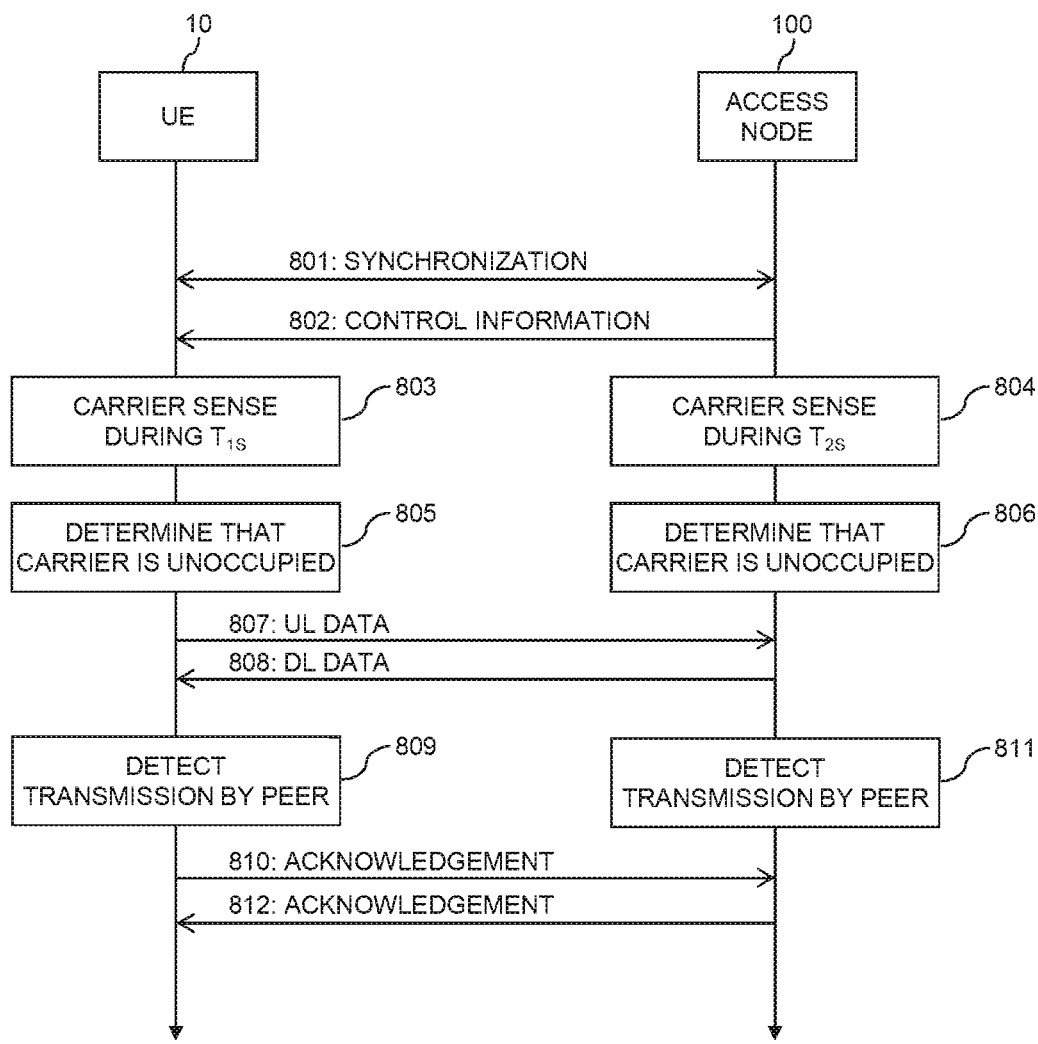
FIG. 8 schematically illustrates a further example of a collision detection process according to an embodiment of the invention.

FIG. 8 shows further exemplary processes which are based on the above-mentioned CS operation and CD operation. The example of FIG. 8 assumes BFD communication according to the scenario of FIG. 1. Specifically, the first BFD peer is assumed to correspond to the UE 10 of FIG. 1, and the second BFD peer is assumed to correspond to the access node 100 of FIG. 1. However, it is to be understood that corresponding processes could also be performed in the scenario of FIG. 2 or in the scenario of FIG. 3. In the illustrated example, it is further assumed that BFD communication between the UE 10 and the access node 100 is based on a retransmission protocol requiring that successful decoding of data is confirmed by sending an acknowledgement to the sender of the data.

As illustrated by 801, the UE 10 and the access node 100 may first perform synchronization, The synchronization may help to establish a common timing reference of the UE 10 and the access node 100. For example, the synchronization may be performed on the basis of a PSS and/or SSS broadcasted by the access node.

As further illustrated, the access node 100 may transmit control information 802 to the UE 10. This may in particular include the above-mentioned control information for enabling the UE 10 to distinguish between transmission activity of its BFD peer, i.e., the access node 100, and transmission activity of some other radio device. The control information 802 may for example configure the UE 10 to perform the CS operation in the above-mentioned sensing time window $T_{1S}$. Further, the control information make informed the UE 10 that in the silence period $T_{2N}$ the access node 100 is not transmitting on the carrier frequency F. Further, the control information 802 may also indicate a unique identification signal, reference signal, or signature to be applied by the UE 10 in the BFD communication and/or a unique identification signal, reference signal, or signature to be applied by the access node 100 in the BFD communication. The control information 802 could for example at least in part be transmitted in broadcasted system information, e.g., in an SIB. In addition or as an alternative, the control information could also be transmitted in UE specific control signaling, e.g., in one or more RRC messages.

In the illustrated example it is assumed that the transmission of control information to the access node 100 is not needed to enable the access node 100 to distinguish between transmission activity of its BFD peer, i.e., the UE 10, and transmission activity of some other radio device. Rather, this information may be determined locally at the access node 100. For example, the access node 100 may determine the sensing time windows $T_{1S}$, $T_{2S}$ and the silence periods $T_{1N}$, $T_{2N}$ and indicate at least some of these parameters in the control information 802 to the UE 10 and also utilize at least some of these parameters locally when performing the CS operation. However, it is noted that at least a part of this information could also be negotiated or otherwise agreed by the UE 10 and the access node 100.

At some time, the UE 10 may need to transmit UL data to the access node 100 and thus first performs the CS operation during the sensing time window $T_{1S}$, as illustrated by at block 803. The CS operation by the UE 10 may be based on the processes explained in connection with FIG. 5A and in particular take into account that during the silence period $T_{2N}$ the access node 100 is not transmitting on the carrier frequency F. At the same time, the access node 100 may need to transmit DL data to the UE 10 and thus first performs the CS operation during the sensing time window $T_{2S}$, as illustrated by at block 804. The CS operation by the access node 100 may be based on the processes explained in connection with FIG. 5A and in particular take into account that during the silence period $T_{1N}$ the UE 10 is not transmitting on the carrier frequency F.

In the example of FIG. 8, it Is assumed that a result of the CS operations of block 803 and block 804 the carrier frequency F is found to be unoccupied, as illustrated by blocks 805 and 806. Accordingly, the UE 10 proceeds to perform a transmission of the UL data on the carrier frequency F, as illustrated by 807, and the access node proceeds to perform a transmission of the DL data on the carrier frequency F, as illustrated by 808. Due to the BFD communication simultaneous transmission of the UL data and the DL data on the carrier frequency F is possible.

During the transmission 807 of the UL data, the UE 10 detects transmission activity on the carrier frequency F. In the illustrated example, it is assumed that during the transmission 805 of the UL data the UE 10 receives radio signals on the carrier frequency F and succeeds in decoding signals originating from the access node 100. Accordingly, the UE 10 assumes that the detected transmission activity is due to a transmission by its BSD peer, i.e., the access node 100, as illustrated by block 809.

Similarly, during the transmission 808 of the DL data, the access node 100 detects transmission activity on the carrier frequency F. In the illustrated example, it is assumed that during the transmission 806 of the DL data the access node 100 receives radio signals on the carrier frequency F and succeeds in decoding signals originating from the UE 10. Accordingly, the access node 100 assumes that the detected transmission activity is due to a transmission by its BSD peer, i.e., the UE 10, as illustrated by block 810.

In the example of FIG. 8, the access node 100 thus successfully decodes the UL data from the transmission 807 and thus sends an acknowledgement to the UE 10, as illustrated by 811. Similarly, the UE 10 successfully decodes the DL data from the transmission 808 and thus sends an acknowledgement to the access node 100, as illustrated by 812.

Figure 9:
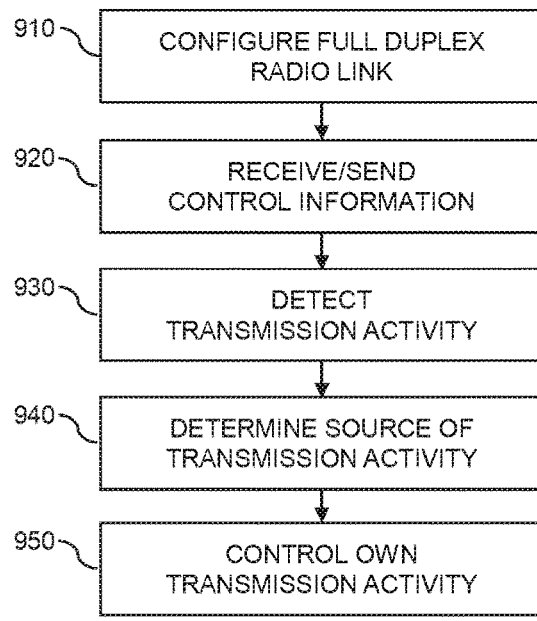
FIG. 9 shows a flowchart for schematically illustrating a method according to an embodiment of the invention.

FIG. 9 shows a flowchart for illustrating a method of controlling radio transmissions. The method of FIG. 9 may be utilized for implementing the illustrated concepts in a radio device, such as the above-mentioned UE 10, UE 11, or access node 100. If a processor-based implementation of the radio device is used, the steps of the method may be performed by one or more processors of the radio device. In such a case the radio device may further comprise a memory in which program code for implementing the below described functionalities is stored.

At step 910, the radio device configures a full duplex radio link from the radio device to a further radio device. The further radio device may for example be a UE, such as one of the above-mentioned UEs 10, 11. The further radio device may also be an access node of a wireless communication network, such as the above-mentioned access node 100. The full duplex radio link supports simultaneous bidirectional transmission on a carrier frequency. The full duplex radio link may for example correspond to the above-mentioned BSD link. The full duplex radio link may be configured between a UE and an access node of a wireless communication network, e.g., between the UE 10 and the access node 100 in the scenario of FIG. 1. In this case, the radio device may either correspond to the UE 10 or to the access node 100. Further, the full duplex radio link may be configured between two UEs, e.g., between the UE 10 and the further UE 11 in the scenario of FIG. 2 or 3. Accordingly, in some scenarios the full duplex radio link may be utilized for D2D communication.

At step 920, the radio device may receive or send control information. In particular, the radio device may receive control information from the further radio device. For example, in the scenario of FIG. 1 the UE 10 may receive control information from the access node 100. Further, in the scenario of FIG. 3 the UE 10 may receive control information from the UE 11 and/or the UE 11 may receive control information from the UE 10. Further, the radio device may send control information to the further radio device. For example, in the scenario of FIG. 1 the access node 100 may send control information to the UE 10. Further, in the scenario of FIG. 3 the UE 10 may send control information to the UE 11 and/or the UE 11 may send control information to the UE 10. In some scenarios, control information may also be exchanged bidirectionally between the radio device and the further radio device, e.g., in the course of a negotiation process.

In some scenarios, the radio device may also receive control information from a control node. For example, in the scenario of FIG. 1, the access node 100 may act as a control node for controlling operations of the UE 10. Further, in the scenario of FIG. 2, the access node 100 may act as a control node for controlling operations of the UE 10 and of the UE 11, in this case without being an endpoint of the full duplex radio link. It is noted that in some scenarios the radio device could also receive control information from a control node which does not correspond to an access node, but to some other type of control node, e.g., a centralized management node of a wireless communication network.

The control information may have the purpose of enabling the radio device to distinguish between transmission activity transmission activity by the further radio device and transmission activity by some other radio device. For example, the control information may coordinate timing of detection of transmission activity by the radio device with operations of the further radio device, e.g., by indicating time windows such as the above-mentioned sensing window or silence period. Further, the control information may indicate signal sequences applied by the radio device and/or by the further radio device as identification signal, reference signal, signature for communication on the full duplex radio link. For example, the control information may indicate a first signal sequence to be applied by the radio device and a second signal sequence to be applied by the further radio device. The second signal sequence may be orthogonal to the first signal sequence. For example, the first signal sequence and the second signal sequence may correspond to Zadoff-Chu sequences which are cyclically shifted with respect to each other.

At step 930, the radio device detects transmission activity on the carrier frequency. The detected transmission activity may correspond to transmission activity of the further radio device, i.e., by the peer node to which it is connected by the full duplex radio link. Alternatively, the detected transmission activity may correspond to transmission activity of some other radio device, such as the UE 10' in the scenario of FIG. 1, 2, or 3. Further, there may also be own transmission activity of the radio device on the carrier frequency, which may be cancelled using an SI cancellation technique.

The radio device may detect the transmission activity on the carrier frequency before starting its own transmission activity on the carrier frequency. Alternatively, the radio device may detect the transmission activity on the carrier frequency during its own transmission activity on the carrier frequency.

In some scenarios, the radio device may control depending on received control information when to detect the transmission activity on the carrier frequency. This control information may for example be received at step 920. The control information may indicate a time window in which the radio device should detect the transmission activity on the carrier frequency, e.g., in terms of the above-mentioned sensing window. Further, the control information could indicate a time window in which transmission activity by the further radio device is not allowed, such as the above-mentioned silence period, and the radio device could then detect the transmission activity within this time window.

At step 940, the radio device determines whether the detected transmission activity is by the further radio device. By the determination of step 940, the detection of the transmission activity may be performed in a manner which is aware of the full duplex radio link to the further radio device.

For the determination of step 940, the radio device may determine whether the detected transmission activity is within a time window in which transmission activity on the carrier frequency by the further radio device is not allowed. This time window may correspond to the above-mentioned silence period. In response to determining that the detected transmission activity is within the time window in which transmission activity on the carrier frequency by the further radio device is not allowed, the radio device may determine that the detected transmission activity is not from the further radio device. The radio device may determine the time window depending on received control information, e.g., the control information received at step 920.

Alternatively or in addition, the radio device may also attempt decoding of a radio signal associated with the detected transmission activity. In response to successfully decoding the radio signal, the radio device may then determine that the detected transmission activity is from the further radio device.

At step 950, the radio device controls its own transmission activity on the carrier frequency depending on whether the detected transmission activity is by the further radio device.

In some scenarios, the radio device may detect the transmission activity on the carrier frequency before starting its own transmission activity on the carrier frequency. If in this case the radio device detects that the transmission activity is not from the further radio device, the radio device may defer its own transmission activity on the carrier frequency, e.g., until further detection of transmission activity on the carrier frequency shows that there is no transmission activity by some other radio device. Accordingly, the detection of the transmission activity may be used within a CS operation in an LBT procedure for controlling access of multiple radio devices to the carrier frequency, e.g., as explained in connection with FIG. 5A and the examples of FIGS. 7, 8, and 9.

In some scenarios, the radio device may detect the transmission activity on the carrier frequency during its own transmission activity. Accordingly, the detection of the transmission activity may be used within a CD operation for controlling access of multiple radio devices to the carrier frequency, e.g., as explained in connection with the examples of FIGS. 7, 8, and 9. In this case, in response to detecting that the transmission activity is not from the further radio device, the radio device may stop its own transmission activity on the carrier frequency. If the stopped transmission activity includes a transmission of data, the radio device may also initiates a retransmission of the data.

Figure 10:
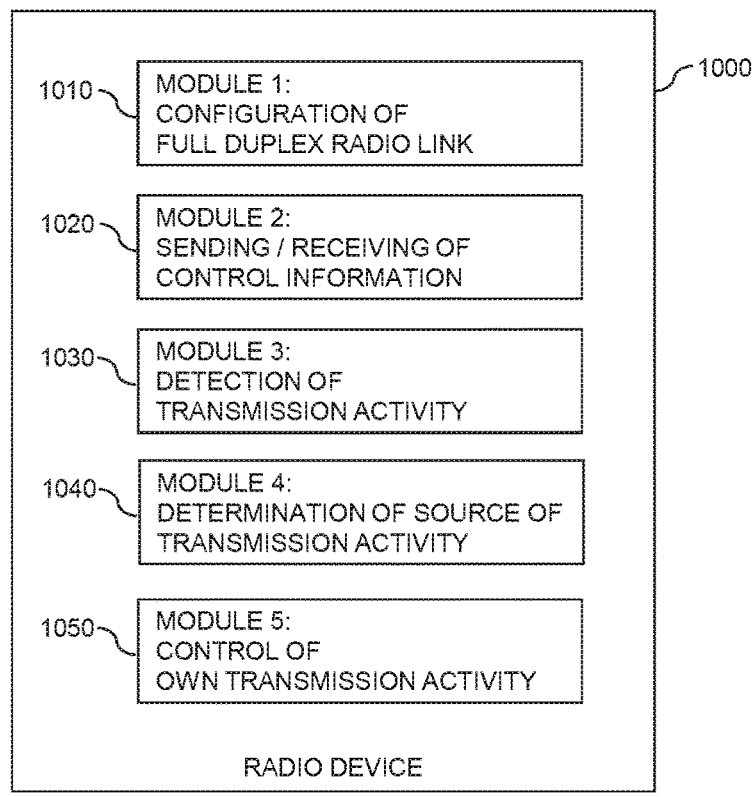
FIG. 10 shows a block diagram for illustrating functionalities of a radio device according to an embodiment of the invention.

FIG. 10 shows a block diagram for illustrating functionalities of a radio device 1000 which operates according to the method of FIG. 9. As illustrated, the radio device 1000 may be provided with a module 1010 configured to configure a full duplex radio link from the radio device to a further radio device, such as explained in connection with step 910. Further, the radio device 1000 may optionally be provided with a module 1020 configured to receive and/or send control information, such as explained in connection with step 920. Further, radio device 1000 may be provided with a module 1030 configured to detect transmission activity, such as explained in connection with step 930. Further, the radio device 1000 may be provided with a module 1040 configured to determine whether the detected transmission activity is from the further radio device, such as explained in connection with step 940. Further, the radio device 1000 may be provided with a module 1050 configured to control its own transmission activity, such as explained in connection with step 950.

It is noted that the radio device 1000 may include further modules for implementing other functionalities, such as known functionalities of a UE or access node. Further, it is noted that the modules of the radio device 1000 do not necessarily represent a hardware structure of the radio device 1000, but may also correspond to functional elements, e.g., implemented by hardware, software, or a combination thereof.

Figure 11:
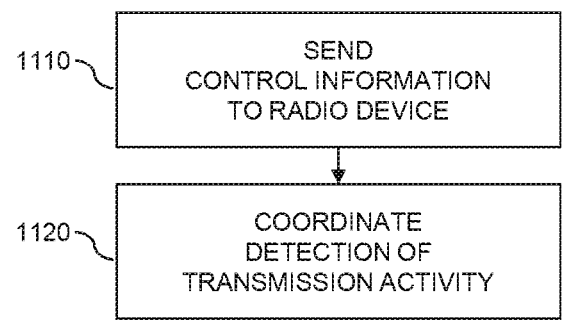
FIG. 11 shows a flowchart for schematically illustrating a further method according to an embodiment of the invention.

FIG. 11 shows a flowchart for illustrating a method of controlling radio transmission. The method of FIG. 11 may be utilized for implementing the illustrated concepts in a control node. For example, in the scenario of FIG. 1, the access node 100 may act as such a control node and for example control operations of the UE 10. Further, in the scenario of FIG. 2, the access node 100 may act as such a control node and for example control operations of the UE 10 and of the UE 11, in this case without being an endpoint of the full duplex radio link. Further such a control node could also correspond to some other type of control node, e.g., a centralized management node of a wireless communication network. If a processor-based implementation of the control node is used, the steps of the method may be performed by one or more processors of the control node. In such a case, the control node may further comprise a memory in which program code for implementing the below described functionalities is stored.

At step 1110, the control node sends control information for a full duplex radio link between a radio device and a further radio device. The full duplex radio link supports simultaneous bidirectional transmission on a carrier frequency. The full duplex radio link may for example correspond to the above-mentioned BSD link. The control node sends the control information to at least one of the radio device and the further radio device.

The radio device may correspond to a UE, such as the above-mentioned UE 10 or UE 11. Further, the radio device may correspond to an access node of a wireless communication network, such as the access node 100. Similarly, the further radio device may correspond to a UE, such as the above-mentioned UE 10 or UE 11. The further radio device may also correspond to an access node of a wireless communication network, such as the access node 100. The full duplex radio link may be configured between a UE and an access node of a wireless communication network, e.g., between the UE 10 and the access node 100 in the scenario of FIG. 1. In this case, the radio device may either correspond to the UE 10 or to the access node 100. Further, the full duplex radio link may be configured between two UEs, e.g., between the UE 10 and the further UE 11 in the scenario of FIG. 2. Accordingly, in some scenarios the full duplex radio link may be utilized for D2D communication.

In the scenario of FIG. 1, the control node may be implemented by the access node 100 and send the control information to the UE 10. In the scenario of FIG. 2, the control node may be implemented by the access node 100 and send the control information to the UE 10, to the UE 11, or to both.

The control information coordinates detection of transmission activity on the carrier frequency by one of the radio device and the further radio device to occur within a time window in which transmission activity on the carrier frequency by the other one of the radio device and the further radio device is not allowed. Accordingly, by sending the control information the control node may coordinate the detection of transmission activity to occur within the time window, as illustrated by step 1120. In this way, the one of the radio device and the further radio device may be enabled to distinguish between transmission activity of the other one of the radio device and the further radio device.

The control information may indicate the time window. In the example of FIG. 5A this may be achieved by indicating the silence period $T_{2N}$ configured for the second BFD peer to the first BFD peer. Further, the control information may control when the one of the radio device and the further radio device detects the transmission activity on the carrier frequency. In the example of FIG. 5A this may be achieved by indicating the sensing time window $T_{1S}$ to the first BSD peer. The sensing time window $T_{1S}$ may in this case be selected in such a way that it is overlapped by the silence period $T_{2N}$ configured for the second BFD peer. Further, the control information may control when transmission activity by the other one of the radio device and the further radio device is not allowed. In the example of FIG. 5A this may be achieved by indicating the silence period $T_{2N}$ configured for the second BFD peer to the second BFD peer. The silence period $T_{2N}$ may in this case be selected in such a way that it overlaps the sensing time window $T_{1S}$ configured for the first BFD peer.

Further, the control information may indicate signal sequences applied by the radio device and/or by the further radio device as identification signal, reference signal, signature for communication on the full duplex radio link. For example, the control information may indicate a first signal sequence to be applied by the radio device and a second signal sequence to be applied by the further radio device. The second signal sequence may be orthogonal to the first signal sequence. For example, the first signal sequence and the second signal sequence may correspond to Zadoff-Chu sequences which are cyclically shifted with respect to each other.

Figure 12:
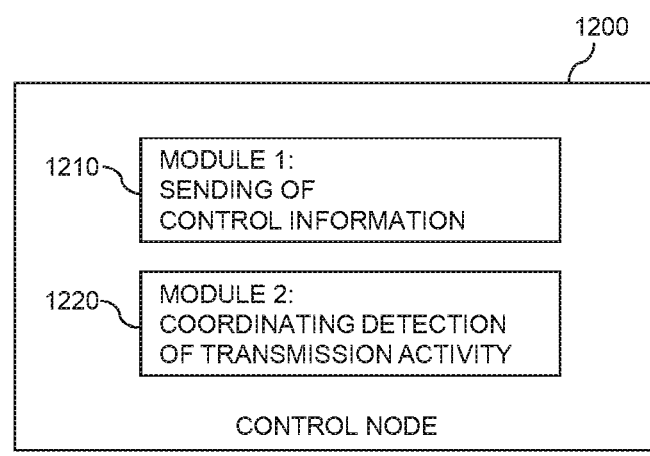
FIG. 12 shows a block diagram for illustrating functionalities of a control node according to an embodiment of the Invention.

FIG. 12 shows a block diagram for illustrating functionalities of a control node 1200 which operates according to the method of FIG. 11. As illustrated, the control node 1200 may be provided with a module 1210 configured to send control information, such as explained in connection with step 1110. Further, the control node 1200 may be provided with a module 1220 configured to coordinate detection of transmission, such as explained in connection with step 1120.

It is noted that the control node 1200 may include further modules for implementing other functionalities, such as known functionalities of an access node of a wireless communication network known functionalities of a centralized management node of a wireless communication network. Further, it is noted that the modules of the control node 1200 do not necessarily represent a hardware structure of the control node 1200, but may also correspond to functional elements, e.g., implemented by hardware, software, or a combination thereof.

Figure 13:
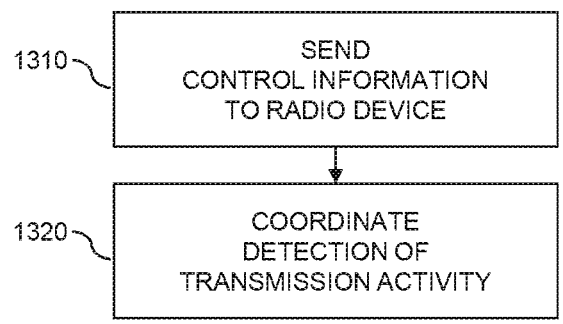
FIG. 13 shows a flowchart for schematically illustrating a further method according to an embodiment of the invention.

FIG. 13 shows a flowchart for illustrating a method of controlling radio transmission. The method of FIG. 13 may be utilized for implementing the illustrated concepts in a radio device, such as the above-mentioned UE 10, UE 11, or access node 100. If a processor-based implementation of the radio device is used, the steps of the method may be performed by one or more processors of the radio device. In such a case the radio device may further comprise a memory in which program code for implementing the below described functionalities is stored.

At step 1310, the radio device sends control information for a full duplex radio link between the radio device and a further radio device. The full duplex radio link supports simultaneous bidirectional transmission on a carrier frequency. The full duplex radio link may for example correspond to the above-mentioned BSD link. The radio device sends the control information to the further radio device.

The radio device may correspond to a UE, such as the above-mentioned UE 10 or UE 11. Further, the radio device may correspond to an access node of a wireless communication network, such as the access node 100. Similarly, the further radio device may correspond to a UE, such as the above-mentioned UE 10 or UE 11. The further radio device may also correspond to an access node of a wireless communication network, such as the access node 100. The full duplex radio link may be configured between a UE and an access node of a wireless communication network, e.g., between the UE 10 and the access node 100 in the scenario of FIG. 1. In this case, the radio device may either correspond to the UE 10 or to the access node 100. Further, the full duplex radio link may be configured between two UEs, e.g., between the UE 10 and the further UE 11 in the scenario of FIG. 3. Accordingly, in some scenarios the full duplex radio link may be utilized for D2D communication.

In the scenario of FIG. 1, the radio device may correspond to the access node 100 and send the control information to the UE 10. However, the radio device could also correspond to the UE 10 and send the control information to the access node 100. In the scenario of FIG. 3, the radio device may correspond to the UE 10 and send the control information to the UE 11. However, the radio device could also correspond to the UE 11 and send the control information to the UE 10.

The control information coordinates detection of transmission activity on the carrier frequency by one of the radio device and the further radio device to occur within a time window in which transmission activity on the carrier frequency by the other one of the radio device and the further radio device is not allowed. Accordingly, by sending the control information the control node may coordinate the detection of transmission activity to occur within the time window, as illustrated by step 1320. In this way, the one of the radio device and the further radio device may be enabled to distinguish between transmission activity of the other one of the radio device and the further radio device.

The control information may indicate the time window. In the example of FIG. 5A this may be achieved by indicating the silence period $T_{2N}$ configured for the second BFD peer to the first BFD peer. Further, the control information may control when the one of the radio device and the further radio device detects the transmission activity on the carrier frequency. In the example of FIG. 5A this may be achieved by indicating the sensing time window $T_{1S}$ to the first BSD peer. The sensing time window $T_{1S}$ may in this case be selected in such a way that it is overlapped by the silence period $T_{2N}$ configured for the second BFD peer. Further, the control information may control when transmission activity by the other one of the radio device and the further radio device is not allowed. In the example of FIG. 5A this may be achieved by indicating the silence period $T_{2N}$ configured for the second BFD peer to the second BFD peer. The silence period $T_{2N}$ may in this case be selected in such a way that it overlaps the sensing time window $T_{1S}$ configured for the first BFD peer.

Further, the control information may indicate signal sequences applied by the radio device and/or by the further radio device as identification signal, reference signal, signature for communication on the full duplex radio link. For example, the control information may indicate a first signal sequence to be applied by the radio device and a second signal sequence to be applied by the further radio device. The second signal sequence may be orthogonal to the first signal sequence. For example, the first signal sequence and the second signal sequence may correspond to Zadoff-Chu sequences which are cyclically shifted with respect to each other.

Figure 14:
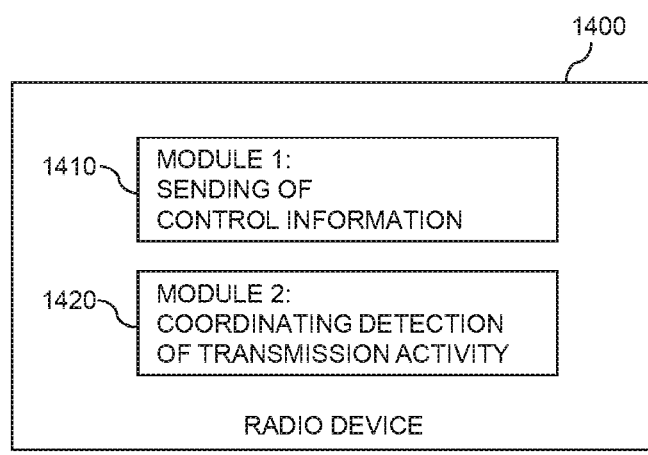
FIG. 14 shows a block diagram for illustrating functionalities of a radio device according to a further embodiment of the invention.

FIG. 14 shows a block diagram for illustrating functionalities of a radio device 1400 which operates according to the method of FIG. 13. As illustrated, the radio device 1400 may be provided with a module 1410 configured to send control information, such as explained in connection with step 1310. Further, the radio device 1400 may be provided with a module 1220 configured to coordinate detection of transmission, such as explained in connection with step 1120.

It is noted that the radio device 1400 may include further modules for implementing other functionalities, such as known functionalities of a UE. Further, it is noted that the modules of the radio device 1400 do not necessarily represent a hardware structure of the radio device 1400, but may also correspond to functional elements, e.g., implemented by hardware, software, or a combination thereof.

Figure 15:
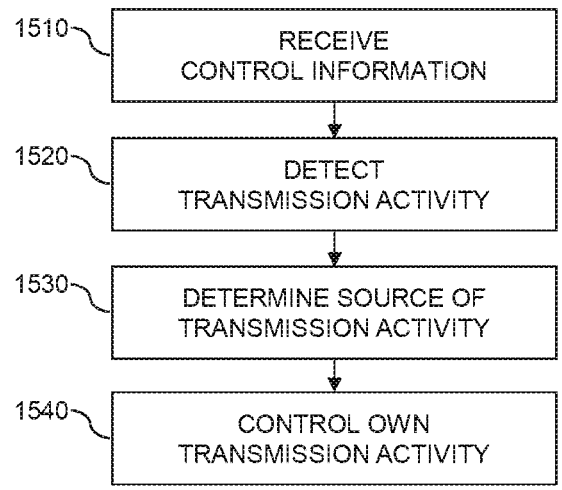
FIG. 15 shows a flowchart for schematically illustrating a further method according to an embodiment of the invention.

FIG. 15 shows a flowchart for illustrating a method of controlling radio transmission. The method of FIG. 15 may be utilized for implementing the illustrated concepts in a radio device, such as the above-mentioned UE 10, UE 11, or access node 100. If a processor-based implementation of the radio device is used, the steps of the method may be performed by one or more processors of the radio device. In such a case the radio device may further comprise a memory in which program code for implementing the below described functionalities Is stored.

At step 1510, the radio device receives control information for a full duplex radio link between the radio device and a further radio device. The full duplex radio link supports simultaneous bidirectional transmission on a carrier frequency. The full duplex radio link may for example correspond to the above-mentioned BSD link. The radio device may receive the control information from the further radio device. Alternatively or in addition, the radio device may receive the control information from a control node.

The radio device may correspond to a UE, such as the above-mentioned UE 10 or UE 11. Further, the radio device may correspond to an access node of a wireless communication network, such as the access node 100. Similarly, the further radio device may correspond to a UE, such as the above-mentioned UE 10 or UE 11. The further radio device may also correspond to an access node of a wireless communication network, such as the access node 100. The full duplex radio link may be configured between a UE and an access node of a wireless communication network, e.g., between the UE 10 and the access node 100 in the scenario of FIG. 1. In this case, the radio device may either correspond to the UE 10 or to the access node 100. Further, the full duplex radio link may be configured between two UEs, e.g., between the UE 10 and the further UE 11 in the scenario of FIG. 2 or 3. Accordingly, in some scenarios the full duplex radio link may be utilized for D2D communication.

In the scenario of FIG. 1, the radio device may correspond to the UE 10 and receive the control information from the access node 100. However, the radio device could also correspond to the access node 100 and receive the control information from the UE 10. In the scenario of FIG. 2, the radio device may correspond to the UE 10 or to the UE 11 and receive the control information from the access node 100. In the scenario of FIG. 3, the radio device may correspond to the UE 10 and receive the control information from the UE 11. However, the radio device could also correspond to the UE 11 and receive the control information from the UE 10.

The control information coordinates detection of transmission activity on the carrier frequency by the radio device to occur within a time window in which transmission activity on the carrier frequency by the further radio device is not allowed. The control information may thus enable the radio device to distinguish between transmission activity of the other one of the radio device and the further radio device.

The control information may indicate the time window. In the example of FIG. 5A this may be achieved by Indicating the silence period $T_{2N}$ configured for the second BFD peer to the first BFD peer. Further, the control information may control when the one of the radio device and the further radio device detects the transmission activity on the carrier frequency. In the example of FIG. 5A this may be achieved by indicating the sensing time window $T_{1S}$ to the first BSD peer. The sensing time window $T_{1S}$ may in this case be selected in such a way that it is overlapped by the silence period $T_{2N}$ configured for the second BFD peer. Further, the control information may control when transmission activity by the other one of the radio device and the further radio device is not allowed. In the example of FIG. 5A this may be achieved by indicating the silence period $T_{2N}$ configured for the second BFD peer to the second BFD peer. The silence period $T_{2N}$ may in this case be selected in such a way that it overlaps the sensing time window $T_{1S}$ configured for the first BFD peer.

Further, the control information may indicate signal sequences applied by the radio device and/or by the further radio device as identification signal, reference signal, signature for communication on the full duplex radio link. For example, the control information may indicate a first signal sequence to be applied by the radio device and a second signal sequence to be applied by the further radio device. The second signal sequence may be orthogonal to the first signal sequence. For example, the first signal sequence and the second signal sequence may correspond to Zadoff-Chu sequences which are cyclically shifted with respect to each other.

At step 1520, the radio device detects transmission activity on the carrier frequency. This is accomplished based on the control information received at step 1510. In particular, the radio device detects the transmission activity on the carrier frequency in the time window in which transmission activity on the carrier frequency by the further radio device is not allowed. In addition, the radio device may also detect transmission activity outside the time window in which transmission activity on the carrier frequency by the further radio device is not allowed.

The detected transmission activity may correspond to transmission activity of the further radio device, i.e., by the peer node to which it is connected by the full duplex radio link. Alternatively, the detected transmission activity may correspond to transmission activity of some other radio device, such as the UE 10' in the scenario of FIG. 1, 2, or 3. Further, there may also be own transmission activity of the radio device on the carrier frequency, which may be cancelled using an SI cancellation technique.

The radio device may detect the transmission activity on the carrier frequency before starting its own transmission activity on the carrier frequency. Alternatively, the radio device may detect the transmission activity on the carrier frequency during its own transmission activity on the carrier frequency.

At step 1530, the radio device may determine whether the detected transmission activity is by the further radio device. By the determination of step 1530, the detection of the transmission activity may be performed in a manner which is aware of the full duplex radio link to the further radio device.

For the determination of step 1530, the radio device may determine whether the detected transmission activity is within the time window in which transmission activity on the carder frequency by the further radio device is not allowed. In response to determining that the detected transmission activity is within the time window in which transmission activity on the carrier frequency by the further radio device is not allowed, the radio device may determine that the detected transmission activity is not from the further radio device.

Further, the radio device may also attempt decoding of a radio signal associated with the detected transmission activity. In response to successfully decoding the radio signal, the radio device may then determine that the detected transmission activity is from the further radio device.

At step 1540, the radio device may control its own transmission activity on the carrier frequency depending on whether the detected transmission activity is by the further radio device.

In some scenarios, the radio device may detect the transmission activity on the carrier frequency before starting its own transmission activity on the carrier frequency. If in this case the radio device detects that the transmission activity is not from the further radio device, the radio device may defer its own transmission activity on the carrier frequency, e.g., until further detection of transmission activity on the carrier frequency shows that there is no transmission activity by other radio devices than the further radio device. Accordingly, the detection of the transmission activity may be used within a CS operation in an LBT procedure for controlling access of multiple radio devices to the carrier frequency, e.g., as explained in connection with FIG. 5A and the examples of FIGS. 7, 8, and 9.

In some scenarios, the radio device may detect the transmission activity on the carrier frequency during its own transmission activity. Accordingly, the detection of the transmission activity may be used within a CD operation for controlling access of multiple radio devices to the carrier frequency, e.g., as explained in connection with the examples of FIGS. 7, 8, and 9. In this case, in response to detecting that the transmission activity is not from the further radio device, the radio device may stop its own transmission activity on the carrier frequency. If the stopped transmission activity includes a transmission of data, the radio device may also initiates a retransmission of the data.

Figure 16:
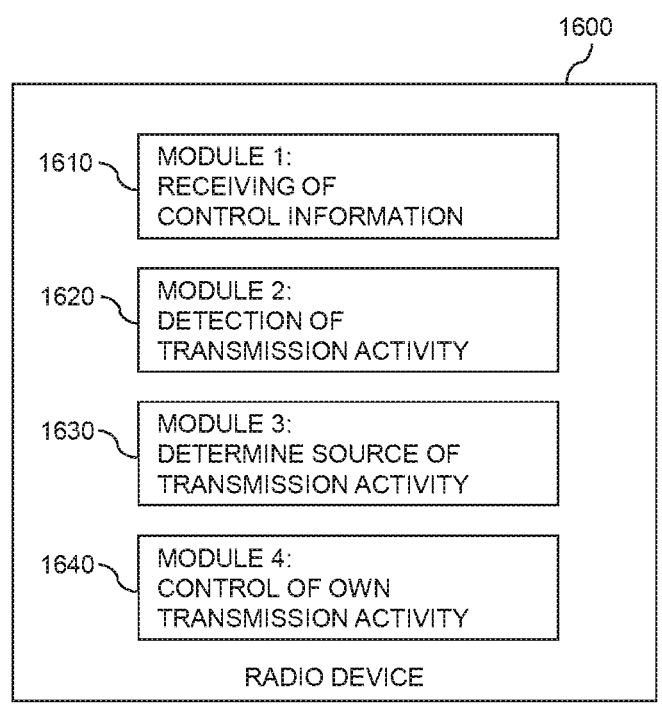
FIG. 16 shows a block diagram for illustrating functionalities of a radio device according to a further embodiment of the invention.

FIG. 16 shows a block diagram for illustrating functionalities of a radio device 1600 which operates according to the method of FIG. 15. As illustrated, the radio device 1600 may be provided with a module 1610 configured to receive control information, such as explained in connection with step 1510. Further, the radio device 1600 may be provided with a module 1620 configured to detect transmission activity, such as explained in connection with step 1520. Further, the radio device 1600 may be provided with an optional module 1630 configured to determine whether the detected transmission activity is from the further radio device, such as explained in connection with step 1530. Further, the radio device 1600 may be provided with an optional module 1640 configured to control its own transmission activity, such as explained in connection with step 1540.

It is noted that the radio device 1600 may include further modules for implementing other functionalities, such as known functionalities of a UE or access node of a wireless communication network. Further, it is noted that the modules of the radio device 1600 do not necessarily represent a hardware structure of the radio device 1600, but may also correspond to functional elements, e.g., implemented by hardware, software, or a combination thereof.

Figure 17:
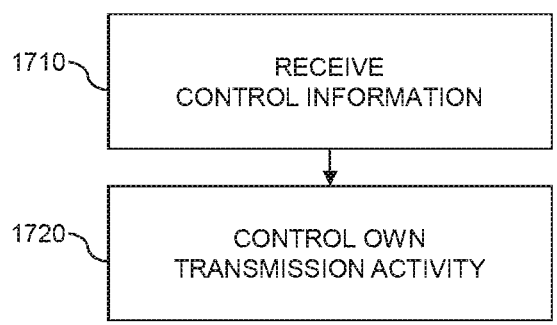
FIG. 17 shows a flowchart for schematically illustrating a further method according to an embodiment of the invention.

FIG. 17 shows a flowchart for illustrating a method of controlling radio transmission. The method of FIG. 17 may be utilized for implementing the illustrated concepts in a radio device, such as the above-mentioned UE 10, UE 11, or access node 100. If a processor-based implementation of the radio device is used, the steps of the method may be performed by one or more processors of the radio device. In such a case the radio device may further comprise a memory in which program code for implementing the below described functionalities is stored.

At step 1710, the radio device receives control information for a full duplex radio link between the radio device and a further radio device. The full duplex radio link supports simultaneous bidirectional transmission on a carrier frequency. The full duplex radio link may for example correspond to the above-mentioned BSD link. The radio device may receive the control Information from the further radio device. Alternatively or in addition, the radio device may receive the control information from a control node.

The radio device may correspond to a UE, such as the above-mentioned UE 10 or UE 11. Further, the radio device may correspond to an access node of a wireless communication network, such as the access node 100. Similarly, the further radio device may correspond to a UE, such as the above-mentioned UE 10 or UE 11. The further radio device may also correspond to an access node of a wireless communication network, such as the access node 100. The full duplex radio link may be configured between a UE and an access node of a wireless communication network, e.g., between the UE 10 and the access node 100 in the scenario of FIG. 1. In this case, the radio device may either correspond to the UE 10 or to the access node 100. Further, the full duplex radio link may be configured between two UEs, e.g., between the UE 10 and the further UE 11 in the scenario of FIG. 2 or 3. Accordingly, in some scenarios the full duplex radio link may be utilized for D2D communication.

In the scenario of FIG. 1, the radio device may correspond to the UE 10 and receive the control information from the access node 100. However, the radio device could also correspond to the access node 100 and receive the control information from the UE 10. In the scenario of FIG. 2, the radio device may correspond to the UE 10 or to the UE 11 and receive the control information from the access node 100. In the scenario of FIG. 3, the radio device may correspond to the UE 10 and receive the control information from the UE 11. However, the radio device could also correspond to the UE 11 and receive the control information from the UE 10.

The control information coordinates detection of transmission activity on the carrier frequency by the further radio device to occur within a time window in which transmission activity on the carrier frequency by the radio device is not allowed. The control information may thus enable the further radio device to distinguish between transmission activity of the other one of the radio device and the further radio device.

The control information may indicate the time window. In the example of FIG. 5A this may be achieved by indicating the silence period $T_{2N}$ configured for the second BFD peer to the first BFD peer. Further, the control information may control when the one of the radio device and the further radio device detects the transmission activity on the carrier frequency. In the example of FIG. 5A this may be achieved by indicating the sensing time window $T_{1S}$ to the first BSD peer. The sensing time window $T_{1S}$ may in this case be selected in such a way that it is overlapped by the silence period $T_{2N}$ configured for the second BFD peer. Further, the control Information may control when transmission activity by the other one of the radio device and the further radio device is not allowed. In the example of FIG. 5A this may be achieved by indicating the silence period $T_{2N}$ configured for the second BFD peer to the second BFD peer. The silence period $T_{2N}$ may in this case be selected in such a way that it overlaps the sensing time window $T_{1S}$ configured for the first BFD peer.

Further, the control information may indicate signal sequences applied by the radio device and/or by the further radio device as identification signal, reference signal, signature for communication on the full duplex radio link. For example, the control information may indicate a first signal sequence to be applied by the radio device and a second signal sequence to be applied by the further radio device. The second signal sequence may be orthogonal to the first signal sequence. For example, the first signal sequence and the second signal sequence may correspond to Zadoff-Chu sequences which are cyclically shifted with respect to each other.

At step 1720, the radio device controls its own transmission activity on the carrier frequency. This is accomplished based on the control information received at step 1710. In particular, the radio device controls its own transmission activity to occur outside the time window in which transmission activity on the carrier frequency by the radio device is not allowed. For example, the radio device may control depending the control information when to interrupt or start a transmission on the carrier frequency. Further, the radio device may control depending on the control information when to continue with an interrupted transmission on the carrier frequency.

Figure 18:
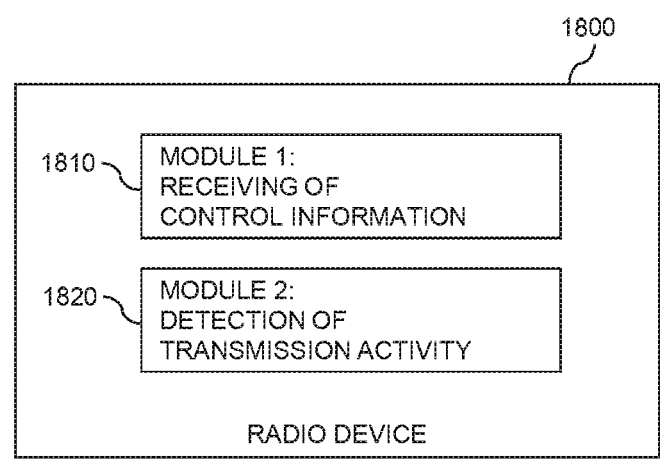
FIG. 18 shows a block diagram for illustrating functionalities of a radio device according to a further embodiment of the invention.

FIG. 18 shows a block diagram for illustrating functionalities of a radio device 1800 which operates according to the method of FIG. 17. As illustrated, the radio device 1800 may be provided with a module 1810 configured to receive control information, such as explained in connection with step 1710. Further, the radio device 1800 may be provided with a module 1820 configured to control its own transmission activity, such as explained in connection with step 1720.

It is noted that the radio device 1800 may include further modules for implementing other functionalities, such as known functionalities of a UE or access node of a wireless communication network. Further, it is noted that the modules of the radio device 1800 do not necessarily represent a hardware structure of the radio device 1800, but may also correspond to functional elements, e.g., implemented by hardware, software, or a combination thereof.

It is to be understood that the methods of FIGS. 9, 11, 13, 15, and 17 may also be combined, e.g., in a system a radio device operating according to the method of FIGS. 9, 13, 15, and/or 17 and a control node operating according the method of FIG. 11. Further, the methods of FIGS. 15 and 17 could be combined in a system including a radio device operating according to the method of FIG. 15 and a further radio device operating according to the method of FIG. 17.

Further, it is noted that the concepts as described above may also be implemented in a system which includes a radio device and a further radio device connected by a full duplex radio link supporting simultaneous bidirectional transmission on a carrier frequency, such as the above-mentioned BFD link. In this system, the radio device may be configured to detect transmission activity on the carrier frequency in a time window in which transmission activity on the carrier frequency by the further radio device is not allowed, while the further radio device is configured to control its own transmission activity on the carrier frequency to occur outside the time window. In the scenario of FIG. 1, the radio device may correspond to the UE 10, while the further radio device corresponds to the access node 100. However, the radio device could also correspond to the access node 100, while the further radio device corresponds to the UE 10. In the scenarios of FIGS. 2 and 3, the radio device may correspond to the UE 10, while the further radio device corresponds to the UE 11. Further, the radio device could also correspond to the UE 11, while the further radio device corresponds to the UE 11.

Figure 19:
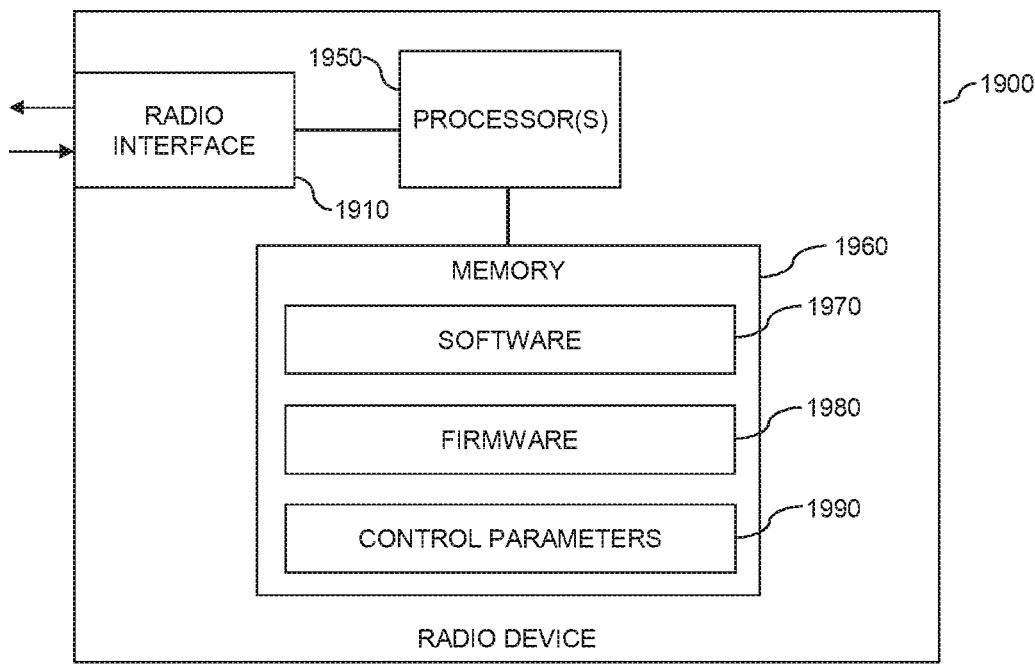
FIG. 19 schematically illustrates structures of a radio device according to an embodiment of the invention.

FIG. 19 illustrates a processor-based implementation of a radio device 1900 which may be used for implementing the above described concepts. For example, the structures as illustrated in FIG. 19 may be used for implementing the above-mentioned UE 10 or access node 100.

As illustrated, the radio device 1900 may include a radio interface 1910 for communicating with other radio devices, such as the above-mentioned UEs 10, 11 or the above-mentioned access node 100. The radio interface 1910 supports BFD communication and may thus be utilized for establishing the above-mentioned BFD link or a similar radio link supporting simultaneous bidirectional transmission on the same carrier frequency. The radio interface 1910 may also be used for receiving and/or sending control information. The radio interface 1910 may for example be based on an LTE radio technology or on a WLAN radio technology.

Further, the radio device 1900 may include one or more processors 1950 coupled to the radio interface 1910 and a memory 1960 coupled to the processor(s) 1950. By way of example, the radio interface 1910, the processor(s) 1950, and the memory 1960 could be coupled by one or more internal bus systems of the radio device 1900. The memory 1960 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1960 may include software 1970, firmware 1980, and/or control parameters 1990. The memory 1960 may include suitably configured program code to be executed by the processor(s) 1950 so as to implement the above-described functionalities of a radio device, such as explained in connection with FIG. 9, 13, 15, or 17.

It is to be understood that the structures as illustrated in FIG. 19 are merely schematic and that the radio device 1900 may actually include further components which, for the sake of clarity, have not been illustrated, e.g., further interfaces or processors. Also, it is to be understood that the memory 1960 may include further program code for implementing known functionalities of a radio device, e.g., known functionalities of a UE or of an access node. According to some embodiments, also a computer program may be provided for implementing functionalities of the radio device 1900, e.g., in the form of a physical medium storing the program code and/or other data to be stored in the memory 1960 or by making the program code available for download or by streaming.

Figure 20:
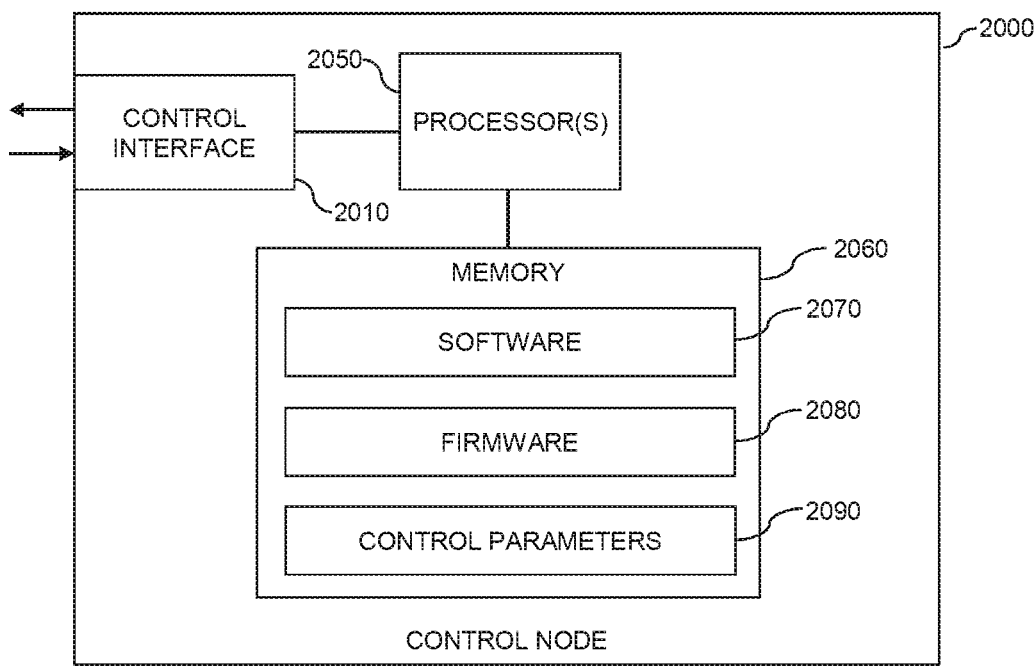
FIG. 20 schematically illustrates structures of a control node according to an embodiment of the invention.

FIG. 20 illustrates a processor-based implementation of a control node 2000 which may be used for implementing the above described concepts. For example, the structures as illustrated in FIG. 20 may be used for implementing the above-mentioned access node 100 or a centralized management node of a wireless communication network.

As illustrated, the control node 2000 may include a control interface 2010 for controlling one or more radio devices, such as the above-mentioned UEs 10, 11 or the above-mentioned access node 100. This the control node 2000 corresponds to an access node, such as the above-mentioned access node 100, the control interface 2010 may be a radio interface, e.g., based on an LTE radio technology or on a WLAN radio technology. If the control node 2000 corresponds to a centralized management node of a wireless communication network, the control interface 2010 may also correspond to a wire-based interface.

Further, the control node 2000 may include one or more processors 2050 coupled to the control Interface 2010 and a memory 2060 coupled to the processor(s) 2050. By way of example, the control interface 2010, the processor(s) 2050, and the memory 2060 could be coupled by one or more internal bus systems of the control node 2000. The memory 2060 may include a ROM, e.g., a flash ROM, a RAM, e.g., a DRAM or SRAM, a mass storage, e.g., a hard disk or solid state disk, or the like. As illustrated, the memory 2060 may include software 2070, firmware 2080, and/or control parameters 2090. The memory 2060 may include suitably configured program code to be executed by the processor(s) 2050 so as to implement the above-described functionalities of a control node, such as explained in connection with FIG. 11.

It is to be understood that the structures as illustrated in FIG. 20 are merely schematic and that the control node 2000 may actually include further components which, for the sake of clarity, have not been illustrated, e.g., further interfaces or processors. Also, it is to be understood that the memory 2060 may include further program code for implementing known functionalities of a control node, e.g., known functionalities of an access node centralized management node of a wireless communication network. According to some embodiments, also a computer program may be provided for implementing functionalities of the control node 2000, e.g., in the form of a physical medium storing the program code and/or other data to be stored in the memory 2060 or by making the program code available for download or by streaming.

As can be seen, the concepts as described above may be used for efficiently controlling BFD communication on a carrier frequency shared by multiple radio devices. In particular, the concepts may allow for implementing a CS operation and/or a CD operation in a manner which is aware of the BFD communication. It can be avoided that a radio device treats the carrier frequency as being occupied even though the carrier frequency is merely used by the BFD peer of the radio device. Similarly, it can be avoided that a radio device treats transmission activity on the carrier frequency as a collision even though the carrier frequency is merely used by the BFD peer of the radio device.

It is to be understood that the examples and embodiments as explained above are merely illustrative and susceptible to various modifications. For example, the illustrated concepts may be applied in connection with various kinds of wireless communication technologies, without limitation to the above-mentioned examples of LTE, LTE LAA, or WLAN. Further, the illustrated concepts may be applied in various kinds of radio devices, including mobile phones, portable computing devices, machine type communication devices, base stations, and relay stations. Moreover, it is to be understood that the above concepts may be Implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method implemented by a radio device of controlling radio transmission, the method comprising:
   a radio device configuring a full duplex radio link from the radio device to a further radio device, the full duplex radio link supporting simultaneous bidirectional transmission on a carrier frequency;
   the radio device detecting transmission activity on the carrier frequency before starting its own transmission activity;
   the radio device determining whether the detected transmission activity is by the further radio device; and
   the radio device controlling its own transmission activity on the carrier frequency depending on whether the detected transmission activity is by the further radio device, wherein controlling its own transmission activity comprises deferring its own transmission activity on the carrier frequency if the detected transmission activity is not by the further radio device.

2. The method of claim 1, further comprising:
   the radio device detecting the transmission activity on the carrier frequency during its own transmission activity; and
   in response to detecting that the transmission activity is not from the further radio device, the radio device stopping its own transmission activity on the carrier frequency.

3. The method of claim 1, further comprising, in response to determining that the detected transmission activity is within a time window in which transmission activity on the carrier frequency by the further radio device is not allowed, the radio device determining that the detected transmission activity is not from the further radio device.

4. The method of claim 3, further comprising the radio device determining the time window depending on received control information.

5. The method of claim 3, further comprising, depending on received control information, the radio device controlling when to detect the transmission activity on the carrier frequency.

6. The method of claim 1, further comprising:
   the radio device attempting decoding of a radio signal associated with the detected transmission activity; and
   in response to successfully decoding the radio signal, the radio device determining that the detected transmission activity is from the further radio device.

7. A method of controlling radio transmission, the method comprising:
   for a full duplex radio link between a radio device and a further radio device, the full duplex radio link supporting simultaneous bidirectional transmission on a carrier frequency, a control node sending control information to at least one of the radio device and the further radio device;
   wherein the control information coordinates detection of transmission activity on the carrier frequency by one of the radio device and the further radio device to occur within a time window in which transmission activity on the carrier frequency by the other one of the radio device and the further radio device is not allowed.

8. A method of controlling radio transmission, the method comprising:
   a radio device receiving control information for a full duplex radio link between the radio device and a further radio device, the full duplex radio link supporting simultaneous bidirectional transmission on a carrier frequency, the control information coordinating detection of transmission activity on the carrier frequency by the radio device to occur within a time window in which transmission activity on the carrier frequency by the further radio device is not allowed; and
   based on the control information, the radio device detecting transmission activity on the carrier frequency during the time window in which transmission activity on the carrier frequency by the further radio device is not allowed.

9. A radio device, comprising:
   processing circuitry;
   memory containing instructions executable by the processing circuitry whereby the radio device is operative to:
      configure a full duplex radio link from the radio device to a further radio device, the full duplex radio link supporting simultaneous bidirectional transmission on a carrier frequency;
      detect transmission activity on the carrier frequency before starting its own transmission activity;
      determine whether the detected transmission activity is by the further radio device; and
      control its own transmission activity on the carrier frequency depending on whether the detected transmission activity is by the further radio device, wherein the processing circuit controls its own transmission activity by deferring its own transmission activity on the carrier frequency if the detected transmission activity is not by the further radio device.

10. A control node, comprising:
    processing circuitry;
    memory containing instructions executable by the processing circuitry whereby the control node is operative to:
       for a full duplex radio link between a radio device and a further radio device, the full duplex radio link supporting simultaneous bidirectional transmission on a carrier frequency, send control information to at least one of the radio device and the further radio device;
       wherein the control information coordinates detection of transmission activity on the carrier frequency by one of the radio device and the further radio device to occur within a time window in which transmission activity on the carrier frequency by the other one of the radio device and the further radio device is not allowed.

11. A radio device comprising:
    processing circuitry;
    memory containing instructions executable by the processing circuitry whereby the radio device is operative to:
       receive control information for a full duplex radio link between the radio device and a further radio device, the full duplex radio link supporting simultaneous bidirectional transmission on a carrier frequency, the control information coordinating detection of transmission activity on the carrier frequency by the radio device to occur within a time window in which transmission activity on the carrier frequency by the further radio device is not allowed; and based on the control information, detect transmission activity on the carrier frequency during the time window in which transmission activity on the carrier frequency by the further radio device is not allowed.

12. A non-transitory computer readable recording medium storing a computer program product for controlling radio transmission, the computer program product comprising software instructions which, when run on processing circuitry of a radio device, causes the radio device to:
configure a full duplex radio link from the radio device to a further radio device, the full duplex radio link supporting simultaneous bidirectional transmission on a carrier frequency;
detect transmission activity on the carrier frequency;
determine whether the detected transmission activity is by the further radio device; and
control its own transmission activity on the carrier frequency depending on whether the detected transmission activity is by the further radio device.

13. A non-transitory computer readable recording medium storing a computer program product for controlling radio transmission, the computer program product comprising software instructions which, when run on processing circuitry of a radio device, causes the radio device to:
receive control information for a full duplex radio link between the radio device and a further radio device, the full duplex radio link supporting simultaneous bidirectional transmission on a carrier frequency, the control information coordinating detection of transmission activity on the carrier frequency by the radio device to occur within a time window in which transmission activity on the carrier frequency by the further radio device is not allowed; and
based on the control information, detect transmission activity on the carrier frequency during the time window in which transmission activity on the carrier frequency by the further radio device is not allowed.

14. A non-transitory computer readable recording medium storing a computer program product for controlling radio transmission, the computer program product comprising software instructions which, when run on processing circuitry of a control node, causes the control node to:
configure a full duplex radio link from the radio device to a further radio device, the full duplex radio link supporting simultaneous bidirectional transmission on a carrier frequency;
detect transmission activity on the carrier frequency;
determine whether the detected transmission activity is by the further radio device; and
control its own transmission activity on the carrier frequency depending on whether the detected transmission activity is by the further radio device.

15. A non-transitory computer readable recording medium storing a computer program product for controlling radio transmission, the computer program product comprising software instructions which, when run on processing circuitry of a control node, causes the control node to:
for a full duplex radio link between a radio device and a further radio device, the full duplex radio link supporting simultaneous bidirectional transmission on a carrier frequency, send control information to at least one of the radio device and the further radio device;
wherein the control information coordinates detection of transmission activity on the carrier frequency by one of the radio device and the further radio device to occur within a time window in which transmission activity on the carrier frequency by the other one of the radio device and the further radio device is not allowed.

* * * * *